(12) United States Patent
Tsiberidis

(10) Patent No.: US 11,858,293 B2
(45) Date of Patent: *Jan. 2, 2024

(54) ATTACHMENT FOR A VEHICLE WHEEL

(71) Applicant: GV Engineering GmbH, Heimsheim (DE)

(72) Inventor: Konstantin Tsiberidis, Untergruppenbach (DE)

(73) Assignee: GV Engineering GmbH, Heimsheim (DE)

( * ) Notice: Subject to any disclaimer, the term of this patent is extended or adjusted under 35 U.S.C. 154(b) by 948 days.

This patent is subject to a terminal disclaimer.

(21) Appl. No.: 16/481,303

(22) PCT Filed: Jan. 29, 2018

(86) PCT No.: PCT/EP2018/052144
§ 371 (c)(1),
(2) Date: Oct. 18, 2019

(87) PCT Pub. No.: WO2018/138341
PCT Pub. Date: Aug. 2, 2018

(65) Prior Publication Data
US 2020/0164682 A1  May 28, 2020

(30) Foreign Application Priority Data
Jan. 27, 2017 (DE) .......................... 102017101664.3

(51) Int. Cl.
*B60B 11/10* (2006.01)
*B60B 3/16* (2006.01)

(52) U.S. Cl.
CPC ................ *B60B 11/10* (2013.01); *B60B 3/16* (2013.01); *B60B 2310/307* (2013.01); *B60B 2900/731* (2013.01)

(58) Field of Classification Search
CPC ........ B60B 11/10; B60B 15/26; B60B 15/263
See application file for complete search history.

(56) References Cited

U.S. PATENT DOCUMENTS

| 1,055,372 | A | | 3/1913 | Turnbull |
| 1,558,864 | A | * | 10/1925 | Goyette .................. B60B 11/10 301/38.1 |
| 2,083,367 | A | | 6/1937 | Fuller |
| 2,354,444 | A | | 7/1944 | Lyon |

(Continued)

FOREIGN PATENT DOCUMENTS

| CN | 201009683 Y | 1/2008 |
| CN | 102423995 A | 4/2012 |

(Continued)

OTHER PUBLICATIONS

German language International Search Report and Written Opinion, dated Apr. 18, 2018, 11 pages.

(Continued)

*Primary Examiner* — Jason R Bellinger
(74) *Attorney, Agent, or Firm* — Barnes & Thornburg LLP

(57) ABSTRACT

An attachment for a vehicle wheel enables driving operation with limited tire function. The attachment includes a base body and a fastening device for fastening the attachment to a rim of the vehicle wheel, wherein the base body, when seen in an axial direction, is circular or annular in shape.

12 Claims, 27 Drawing Sheets

(56) References Cited

U.S. PATENT DOCUMENTS

| | | | |
|---|---|---|---|
| 3,112,784 A | | 12/1963 | Montenare |
| 3,567,287 A | * | 3/1971 | Nutter .................... B60B 11/10 |
| | | | 301/38.1 |
| 3,608,970 A | * | 9/1971 | Strumbos ................ B60C 17/00 |
| | | | 301/38.1 |
| 3,679,267 A | * | 7/1972 | Zachmann .............. B60B 11/10 |
| | | | 301/38.1 |
| 4,666,216 A | | 5/1987 | Smith |
| 5,407,255 A | * | 4/1995 | Feldman ................ B60C 27/14 |
| | | | 301/38.1 |
| 6,068,346 A | * | 5/2000 | Pender .................... B60B 11/10 |
| | | | 301/40.3 |
| 8,251,458 B2 | | 8/2012 | Biesse |
| 9,404,522 B2 | | 8/2016 | Zhou |
| 2014/0252790 A1 | | 9/2014 | Stuck et al. |
| 2020/0086683 A1 | * | 3/2020 | Tsiberidis ............. B60B 15/263 |
| 2020/0223250 A1 | * | 7/2020 | Tsiberidis ............. B60B 15/263 |
| 2020/0223252 A1 | * | 7/2020 | Tsiberidis ............... B60B 19/00 |
| 2020/0247181 A1 | * | 8/2020 | Tsiberidis ............... B60B 15/26 |

FOREIGN PATENT DOCUMENTS

| | | |
|---|---|---|
| EP | 2662222 A1 | 11/2013 |
| WO | 2006123044 A2 | 11/2006 |
| WO | WO-2021170657 A1 * 9/2021 | ........... B60B 15/263 |

OTHER PUBLICATIONS

Partial English language translation of International Search Report and Written Opinion, dated Apr. 18, 2018, 3 pages.

Chinese Office Action dated Oct. 17, 2022 in application CN201880021657A (10 pages).

Examination Report dated Feb. 28, 2023 in co-pending Australian Application 2018211523 (4 pages).

Examination Report dated Feb. 22, 2023 in co-pending Mexican Application 2019008923 (6 pages).

International Search Report completed Apr. 11, 2018 in Application PCT/EP2018/052144 (7 pages).

* cited by examiner

ATTACHMENT FOR A VEHICLE WHEEL

CROSS REFERENCE TO RELATED APPLICATIONS

This is a national stage entry of International Patent Application No. PCT/EP2018/052144, filed Jan. 29, 2018, which claims the benefit of and priority to German Patent Application No. 10 2017 101 664.3, filed Jan. 27, 2017, the disclosures of which are both expressly incorporated herein by reference in their entireties.

DESCRIPTION

The present invention relates to an attachment for a vehicle wheel for enabling driving operation with limited tire function. Independently thereof, the invention additionally provides an attachment set for a vehicle wheel and a system comprising a vehicle wheel and an attachment or an attachment set.

Vehicle wheel means a vehicle wheel of a motor vehicle. Driving operation with limited tire function in the present case means driving operation in which the tire cannot be operated with the properties that it exhibits under usual road conditions and the usual tire condition. Accordingly, this can mean, for example, driving with a flat tire or also operation of the vehicle in icy or snowy conditions. The preferred field of application of the present invention is to enable driving with a flat tire.

In the present case, axial direction means the direction of the axis of rotation of the vehicle wheel. The radial direction means the direction orthogonal to the axis of rotation of the vehicle wheel. The tire of the vehicle wheel is thus arranged radially outwards when seen from the rim of the vehicle wheel. The bolt circle of the vehicle wheel, for example, is located radially inwards.

The attachment according to the invention is configured with a base body and a fastening device for fastening the attachment to the rim of the vehicle wheel and is characterized in that the base body, when seen in an axial direction, is circular or largely annular in shape. The base body is preferably in the form of a steel disc. However, other materials are also conceivable. The statement regarding the shape of the base body relates to its state when the attachment is mounted on the vehicle wheel in its configuration intended for operation. For example, the base body can be disassembled into a plurality of individual parts, each of which is no longer circular or annular in shape.

The attachment according to the invention can be used as a compact alternative to a spare wheel.

It is advantageous if the fastening device comprises at least one detachable fastening means, optionally a plurality of detachable fastening means. The fastening means can to that end be detachably fastened or capable of being detachably fastened to a holding lug of the fastening device, for example. Such a detachable fastening can be achieved, for example, via a screw connection.

It is also advantageous if the fastening device is so configured that the detachable fastening means in at least two positions which are arranged offset relative to one another in the radial direction can be connected to the base body in two positions which are each adapted to a specific rim diameter. For example, the fastening device can for that purpose comprise at least two holding lugs which are arranged offset relative to one another in the radial direction, so that, according to the rim diameter of the vehicle wheel to which the attachment is to be attached, the fastening means can then be fastened via the corresponding holding lug and thus connected to the base body. The same attachment can thus be used, for example, for 17 inch and 18 inch rims.

It is also advantageous if the fastening means are spring mounted relative to the base body, for example relative to holding lugs or other devices for fastening the fastening means. Likewise or alternatively, the holding lugs or other devices for fastening the fastening means can be spring mounted relative to the base body.

It is also advantageous if the fastening device is so configured that it is adaptable in respect of the rim diameter. This can be achieved, for example, by the above-described changeable position of the fastening means or also by a fastening means which is displaceable in the radial direction or by a gripping mechanism which is adaptable to different diameters in the radial direction. Such an adaptable gripping mechanism can work, for example, similarly to a clamping chuck, and the fastening means can work according to a clamping jaw.

It is also advantageous if the fastening device comprises at least one fastening means, preferably a plurality of fastening means, which in their state connected to the base body are movable, in particular displaceable, in the radial direction relative to the base body. The fastening means can thus, according to the rim diameter, be moved in the radial direction towards the rim or the rim flange. Clamping of the attachment onto the rim or the rim flange can thus also be achieved efficiently and securely.

It is also advantageous if the fastening device comprises a coupling mechanism which couples a movement of at least two movable, preferably all the movable, fastening means in the radial direction and/or in the axial direction, preferably wherein the coupling mechanism is so configured that the movement of the coupled movable fastening means is uniform. For example, the attachment according to the invention can in this embodiment comprise claw-type fastening means which are radially movable.

The radial movability can be provided in different positions in which the fastening means can be mounted on the attachment, or the fastening means can be mounted in a radially displaceable manner in a specified position on the attachment. The coupling mechanism ensures that, in the case of a radial displacement of one of the fastening means, the other fastening means likewise move radially in the same direction. In this embodiment, the coupled fastening means thus all move either radially inwards or radially outwards. The coupled fastening means thereby preferably move uniformly, that is to say with the same speed, inwards. To that end, the individual fastening means can be connected together, for example, via a type of rigid tension belt system. Coupling via, for example, pneumatic or hydraulic lines is also conceivable. The fastening means can, however, also be connected together, for example, via a type of toothed wheel system in order to achieve the coupling. It is preferred if not only the radial movement of the individual fastening means is coupled but, either alternatively or in addition, also an axial movement of the fastening means is coupled, for example, in one of the ways described above.

It is also advantageous if the fastening device, preferably at least one of the fastening means, preferably a plurality, in particular all, of the fastening means comprise a hook portion which is configured to engage behind a portion, in particular a rim flange, of the rim of the vehicle wheel. Via such a hook portion, the attachment can advantageously be securely mounted on the rim of the vehicle wheel. A hook portion means a portion which is so configured that it is able to engage in an interlocking manner behind a portion of the rim, preferably the rim flange of the rim. A preferred embodiment is characterized in that the fastening device, preferably on a plurality of fastening means distributed around the circumference, has a plurality of such hook portions distributed around the circumference, which can each engage in an interlocking manner behind the rim flange of the rim. Preferably, the hook portions are displaceable in the radial direction, preferably likewise in the axial direction. They can thus easily be displaced in the direction of the rim flange and engage behind it.

It is also advantageous if the fastening device comprises a contact portion, which is preferably arranged on the hook portion, wherein the contact portion comprises a resilient, elastic coating for preventing damage to the portion of the rim, in particular of the rim flange. The contact portion means the portion of the fastening device which, when the attachment is mounted as intended on the vehicle wheel, or on the rim of the vehicle wheel, contacts the rim, in particular the rim flange. By means of the described resilient elastic coating, which can be implemented, for example, by a rubber coating, damage to the rim, or the rim flange, is reliably avoided.

It is also advantageous if the contact portion, in particular the hook portion, is curved in the circumferential direction in order to conform to the rim flange. To that end, the hook portions or the contact portion, for example, of the fastening device can be elongate and curved in the circumferential direction according to the circumferential curve of the rim flange. The curve of the contact portions need only correspond substantially to that of the rim, in particular if the resilient elastic coating is present.

It is also advantageous if the fastening device is so configured that it contacts the rim, in particular the rim flange, over at least a sixth, preferably a quarter, preferably a third, preferably half, of its circumferential extent, when the attachment is mounted on the vehicle wheel. This is possible, for example, as a result of the above-mentioned hook portions or contact portions which are curved in the circumferential direction. For example, in this embodiment the contact portions and/or the hook portions can thus rest on the rim flange over a sixth of the circumferential extent thereof.

It is also advantageous if the fastening device, preferably the contact portion, preferably the fastening means, in particular the hook portion thereof, is so configured that the attachment, on fastening to the rim of the vehicle wheel, is urged in the axial direction towards the rim. The attachment thus pulls itself in the direction of the rim on fastening to the vehicle wheel. This can be achieved, for example, via the axial movability of the fastening means. For example, a radial inward movement of the fastening means can be forcibly coupled with an axial movement.

It is also advantageous if the fastening device, in particular the contact portion or the hook portion, comprises a clamping surface which, when seen in the axial direction, slopes radially inwards, preferably in a linear or arcuate manner, wherein the fastening device is so configured that the clamping surface, on fastening of the attachment to the rim of the vehicle wheel, moves, in particular is displaced, radially inwards, and the clamping surface is so configured that the attachment, on fastening to the rim of the vehicle wheel, is urged in the axial direction towards the rim. By means of the clamping surface, which is configured as described above, a movement of the clamping surface, for example by movement of the fastening means, radially inwards at the same time causes a movement which forces the attachment in the direction of the rim of the vehicle wheel. In such a form, the attachment, on fastening, is thus urged towards the vehicle wheel and ensures a secure and firm hold.

The fastening means can be spring mounted or mountable relative to the holding lugs. Likewise or in addition, the holding lugs can be spring mounted relative to the base body. Both the mentioned advantageous embodiments ensure quiet running of the vehicle wheel when a corresponding attachment is mounted thereon.

It is also advantageous if the base body comprises a rim-side part and a part remote from the rim which is detachable from the rim-side part. The base body can thereby be separable into the above-mentioned two parts, for example, along a plane running orthogonally to the axial direction. On the one hand, the attachment can thus be handled more flexibly and, on the other hand, advantages are thus obtained in terms of mounting of the attachment.

It is also advantageous if the base body, or optionally each of the rim-side part and the part remote from the rim, comprises at least two circumferential segments. In this embodiment, the base body, or the respective parts, are thus divided in the circumferential direction into individual segments. Mounting and handling of the attachment are thereby improved.

It is also advantageous if the circumferential segments are connected together in the circumferential direction preferably detachably, in particular via a preferably detachable folding mechanism or an engagement structure. Via a folding mechanism, for example, the attachment, when it is not required, can be folded and stored. If the individual segments are configured to be detachable from one another, then the attachment can be disassembled into individual parts and stored in a space-saving manner. The embodiment variant with the segments which can be detachably connected together additionally offers the possibility of first connecting individual segments together and then mounting those connected segments on the vehicle wheel. After mounting of those connected segments, the vehicle wheel can be turned and a further segment or a plurality of further segments can be inserted in order to complete the attachment on the vehicle wheel. It can thus be possible, for example, to mount the attachment without removing the vehicle wheel from the vehicle.

It is also advantageous if the rim-side part and the part remote from the rim, or a segment of each of the rim-side part and the part remote from the rim, form in the assembled state a receiving portion into which, on assembly into the assembled state, a tread body, or a segment of a tread body, can be inserted in such a manner that it is held in an interlocking manner, in particular via interlocking engagement. A tread body means an element which is configured to form a running surface of the attachment, that is to say the contact surface with the road.

Preferably, the tread body is formed of an elastic rubber material or polymer material. The interlocking holding, or the interlocking engagement, of the tread body can be achieved by a dovetail-shaped channel which is formed between the two parts, wherein the tread body has a corresponding portion having a complementary shape to that channel, which can be received in an interlocking manner in the channel.

It is also advantageous if the tread body is in shock-absorbing form, preferably wherein the tread body is formed of an elastically resilient material and/or has an elastically resilient structure, in particular a structure comprising voids and/or holes. The tread body can thus cushion unevenness of the driving surface. However, an air-filled tread body similar to a tire is also conceivable. A tread body of a polymer material with openings running substantially in the axial direction, which lead to an elastically damping property of the tread body, is conceivable. However, other structures of the tread body which lead to the resilient properties are also conceivable, in particular voids, which can be closed or open, in the tread body.

It can be advantageous if the base body has openings. These openings can serve on the one hand to reduce the weight of the base body and thus of the attachment. On the other hand, these openings 115 can serve to make the attachment readily foldable or collapsible. In the folded or collapsed state, preferably at least one element protruding from the surface of the base body, such as, for example, the fastening device or part of the fastening device, can project into such an opening.

The tread body can advantageously be so configured that it has an extent in the axial direction which corresponds at least to the extent of the base body in the axial direction, but in particular exceeds that extent. In other words, the tread body, when seen in the axial direction, can be thicker than or at least equally as thick as the base body.

It is also advantageous if a radially outer running surface of the attachment extends in the direction of the vehicle wheel, when seen in the axial direction, into a rim mouth of the rim, when the attachment is fastened to the rim of the vehicle wheel. Moreover, it is advantageous if the attachment, or the radially outer running surface thereof, extends in the direction of the vehicle wheel, when seen in the axial direction, to the middle of the rim. In these embodiments, the running surface of the attachment thus partially covers the tires. For example, the attachment can thereby serve as a snow chain substitute. Such a form of the attachment with a correspondingly wide running surface also improves the grip when driving round curves.

It is also advantageous if the attachment comprises an additional fastening element which is configured to fasten the attachment to the rim in the region of the bolt circle, in particular at the bolt circle and/or at the central opening, of the rim and/or at a spoke of the rim. Such an additional fastening element can, for example, be in the form of an arm-like widening towards the bolt circle. The security of the fastening of the attachment is thereby increased.

It is also advantageous if the additional fastening element is fastened detachably or non-detachably to the attachment, preferably wherein the fastening of the additional fastening element is such that the additional fastening element is movable, preferably displaceable and/or pivotable, relative to the attachment. In the case of the detachable additional fastening element, the additional fastening element can be fitted, for example, at the start of mounting, and then the fastening device can be clamped tightly and the additional fastening element then detached. In the case of a displaceable additional fastening element, this can, for example, be pushed out and used for mounting the attachment and pushed in when mounting is complete.

The present invention also provides an attachment set for a vehicle wheel, which set comprises an attachment for fastening to the rim of the vehicle wheel on the vehicle side and a further attachment for fastening to the rim of the vehicle on the side remote from the vehicle, wherein at least one of the two attachments is configured according to one or more of the preceding claims. In the case of the attachment set as just described, when used in the intended manner, an attachment as described above is thus fastened to the outer side of the vehicle wheel and a further attachment is fastened to the inner side of the vehicle wheel. A good road position and driving safety is thus ensured.

It is advantageous if the attachment set comprises a connecting element with which the two attachments of the attachment set can be clamped in a loss-proof manner on opposite sides of the vehicle wheel and mutually against the vehicle wheel, in order to permit final fastening via the fastening means. The connecting element can thus be used to clamp the two attachments relative to the vehicle wheel, the attachments are then fastened to the rim via the fastening device optionally with the fastening means, the hook portions and the contact portion. The connecting element can then be removed. To that end, the connecting element is first guided between the spokes of the rim in order to connect the two attachments together.

The present invention also provides a system comprising a vehicle wheel and an attachment or an attachment set for a vehicle wheel for enabling driving operation with limited tire function, wherein the attachment or the attachment set is configured according to one or more of the preceding embodiments.

It is advantageous if the attachment, or at least one of the attachments, comprises a recess via which the attachment can be screwed to the rim of the vehicle wheel, wherein the rim of the vehicle wheel comprises a screw hole for receiving a corresponding fastening screw, and/or the attachment, or at least one of the attachments, can be connected to the rim of the vehicle wheel via a bolt-and-hole connection, which is preferably self-tensioning and/or self-locking. The attachment or the attachment set can thus be fastened in a simple manner to the correspondingly configured vehicle wheel.

Further features, possible applications and advantages of the invention will become apparent from the following description of exemplary embodiments of the invention, which are explained with reference to the drawing, wherein the features can be fundamental to the invention both in isolation and in different combinations, without explicit reference being made thereto again.

BRIEF DESCRIPTION OF THE DRAWINGS

In the drawings:

in FIG. 14 cut along line XIV-XIV from FIG. 13) and shown in part and in the disassembled state (FIG. 15);

in FIG. 19 cut along line XIX-XIX of FIG. 17);

DETAILED DESCRIPTION

Figure 1:
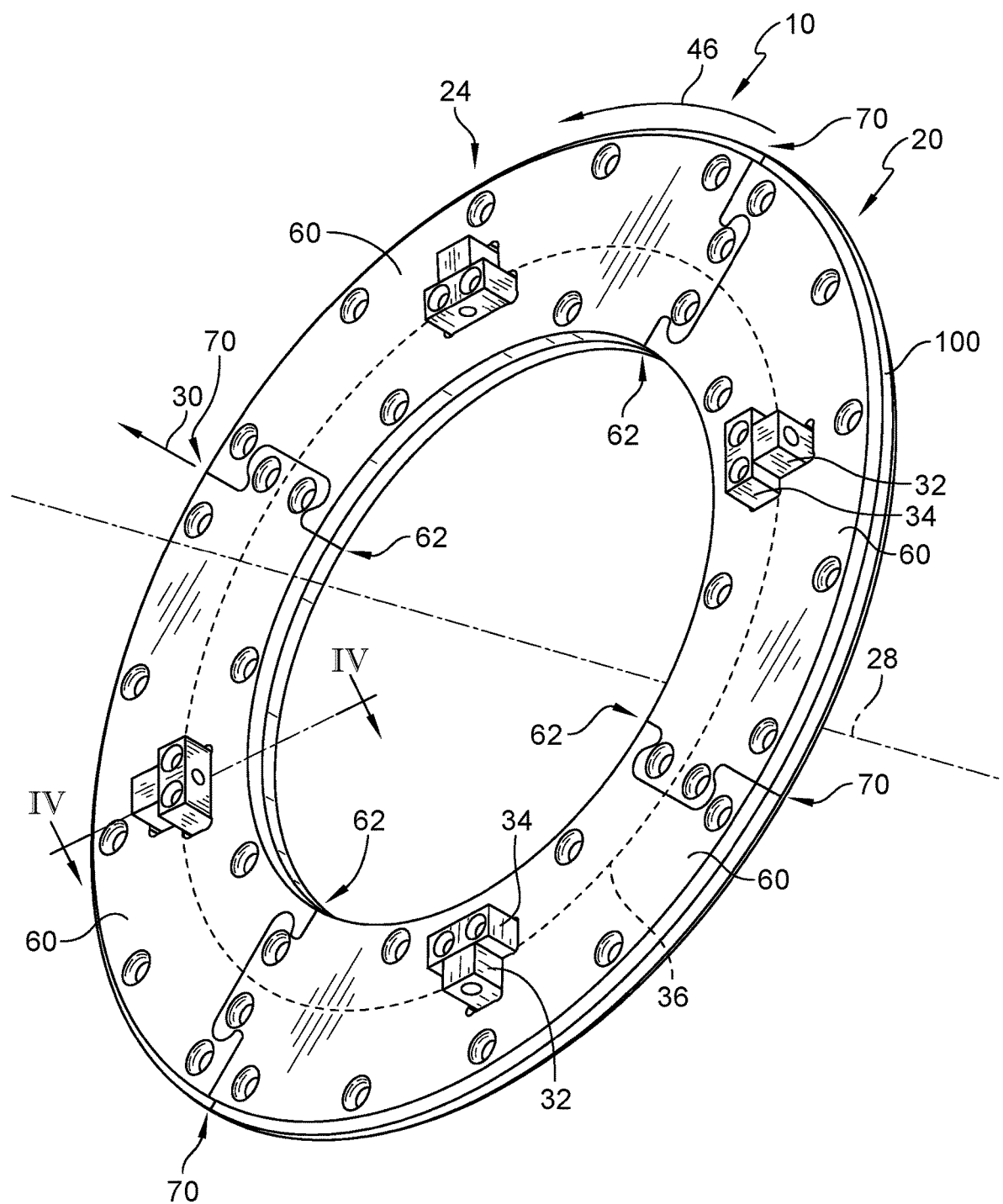
FIGS. 1 to 3, 4A and 4B show a first embodiment of an attachment according to the invention in different views (in FIG. 4B cut along line IV-IV from FIG. 1)

In the following figures, corresponding components and elements carry the same reference numerals. For the sake of clarity, not all reference numerals are repeated in all figures.

An attachment 10 according to the invention is shown in FIG. 1, wherein the vehicle wheel 12 is not shown in FIG. 1 (the vehicle wheel 12 is, however, shown together with the attachment 10 in FIGS. 5 to 8, for example). The attachment 10 serves to enable vehicle operation with limited tire function.

The vehicle wheel 12 is a vehicle wheel 12 of a motor vehicle, wherein the motor vehicle is not shown. Driving operation with limited tire function means in the present case driving operation in which a tire 14 of the vehicle wheel 12 (see, for example, FIGS. 5 to 8) cannot be operated with the properties that it exhibits under usual road conditions and the usual tire condition. This can mean, for example, driving with a flat tire 14 or also operation of the vehicle in icy or snowy conditions. The preferred field of application of the present invention is to enable driving with a flat tire 14.

Figure 17:
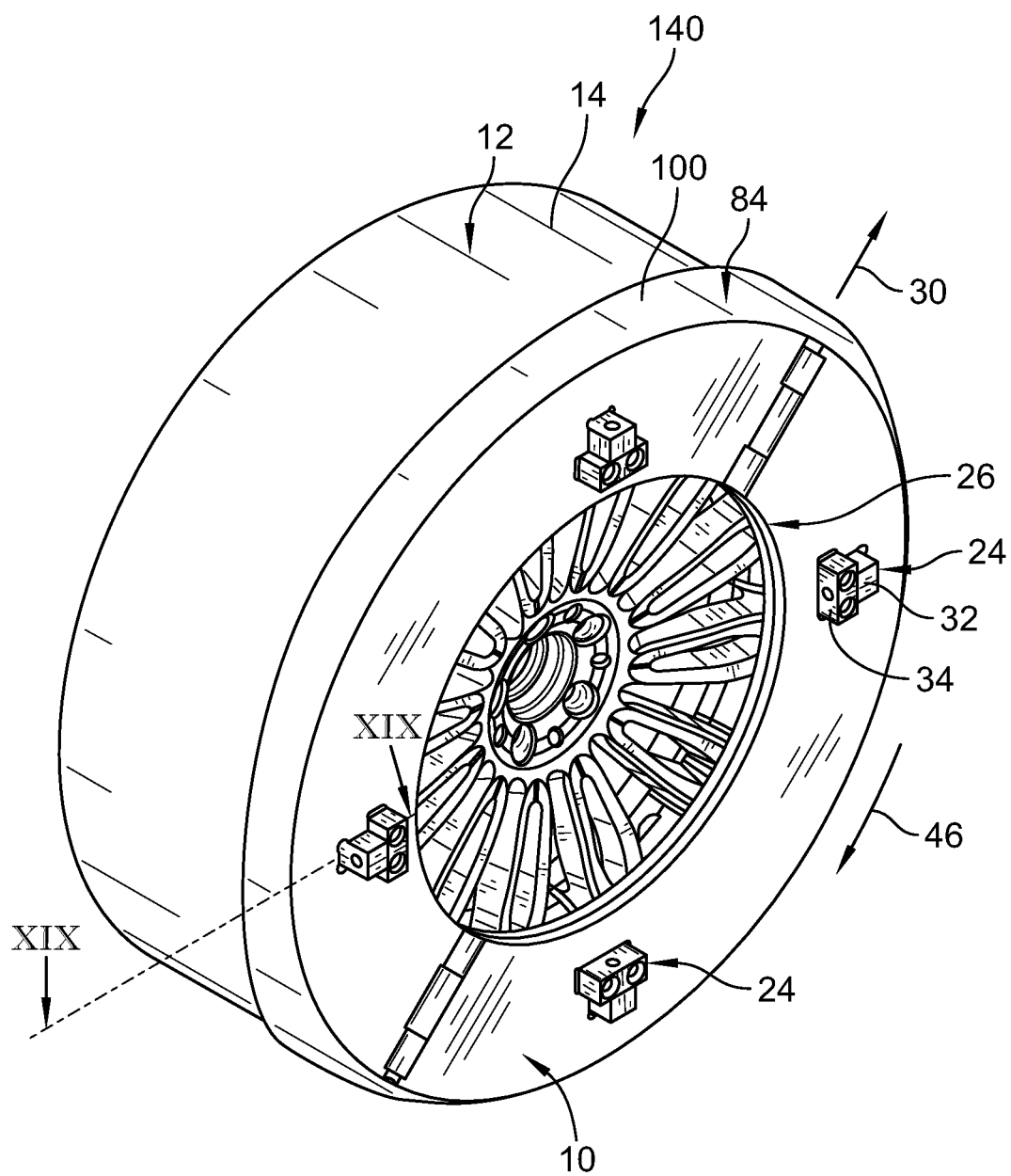
FIGS. 17 to 19 show an alternative embodiment of the attachment in the state mounted on the vehicle wheel (FIGS. 17 to 19.
Figure 18:
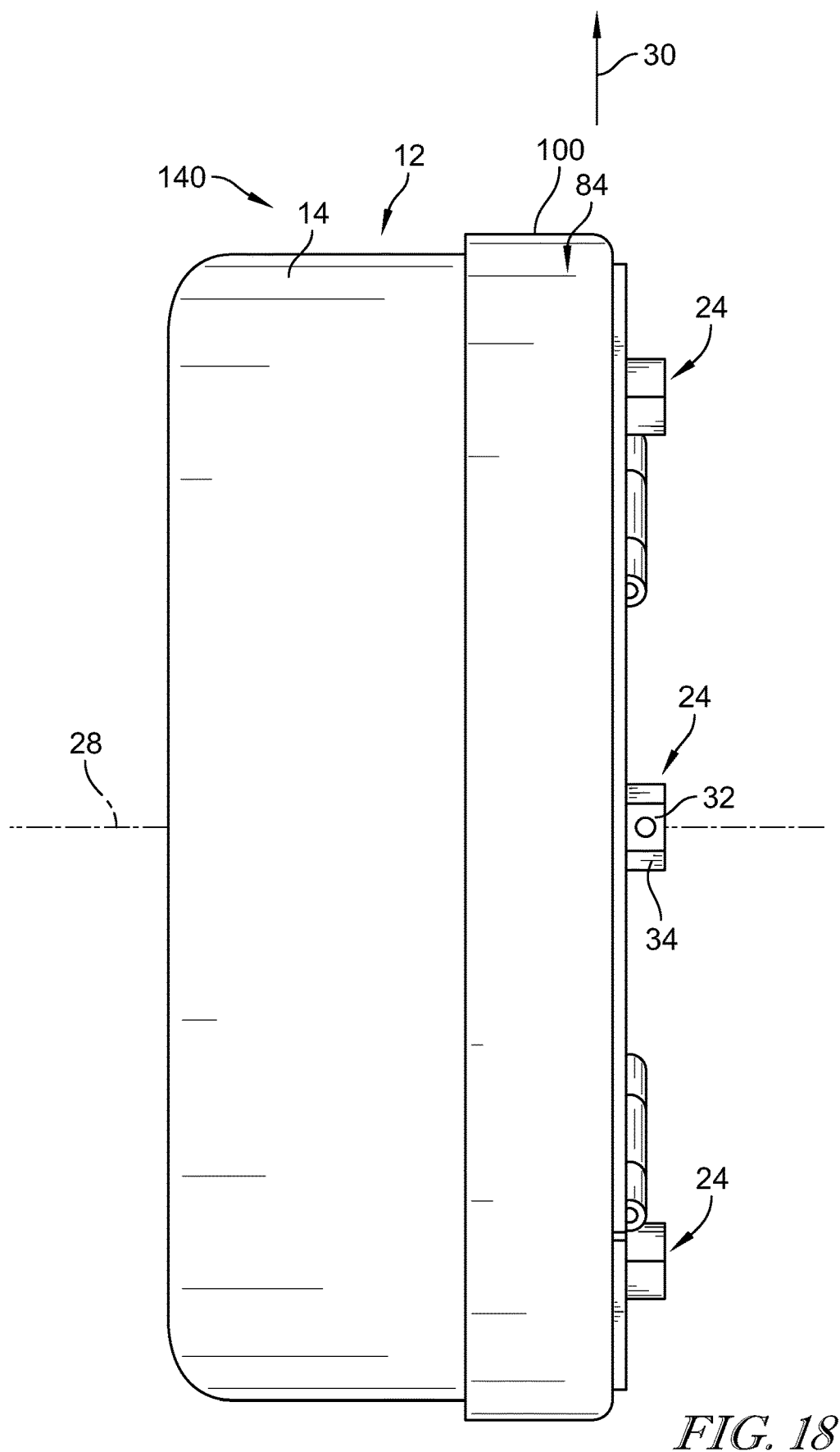
Figure 19:
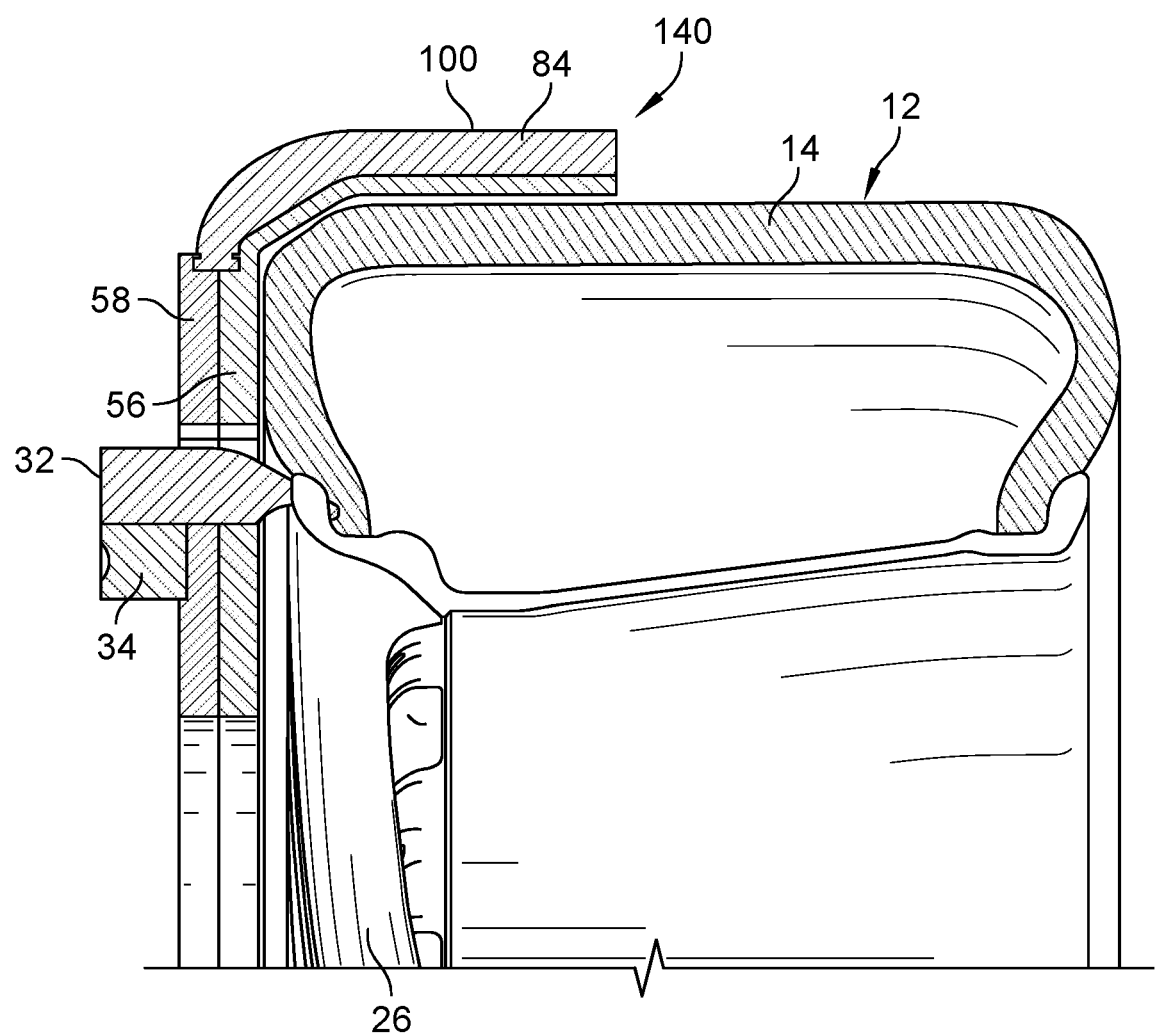

The embodiment shown in FIGS. 17 to 19 is suitable in particular for enabling driving operation in snowy or icy conditions.

The attachment 10 generally comprises a base body 20 and a fastening device 24 for fastening the attachment 10 to a rim of the vehicle wheel 12. The vehicle wheel 12 includes a wheel disc 26 and a rim 105 to which the tire 14 is attached, wherein the rim 105 is made up of a rim mouth 107 and a rim flange 40 (see, for example, FIG. 8).

The base body 20, when seen in an axial direction 28, is circular or largely annular in shape (see, for example, FIG. 1). This means that the base body 20 in its assembled state, as is shown, for example, in FIG. 1, in which it is also mounted on the vehicle wheel 12 in driving operation, has the shape just mentioned.

In the present case, axial direction 28 means the direction of the axis of rotation of the vehicle wheel 12. A radial direction 30 means the direction orthogonal to the axis of rotation of the vehicle wheel 12. The tire 14 of the vehicle wheel 12 is thus arranged radially outwards, when seen from the wheel disc 26 of the vehicle wheel 12. A bolt circle 33 (see, for example, FIG. 6) of the vehicle wheel 12, for example, is located radially inwards.

The fastening device 24 can comprise at least one detachable fastening means 32, advantageously a plurality of detachable fastening means (see, for example, FIGS. 1 to 11).

Figure 2:
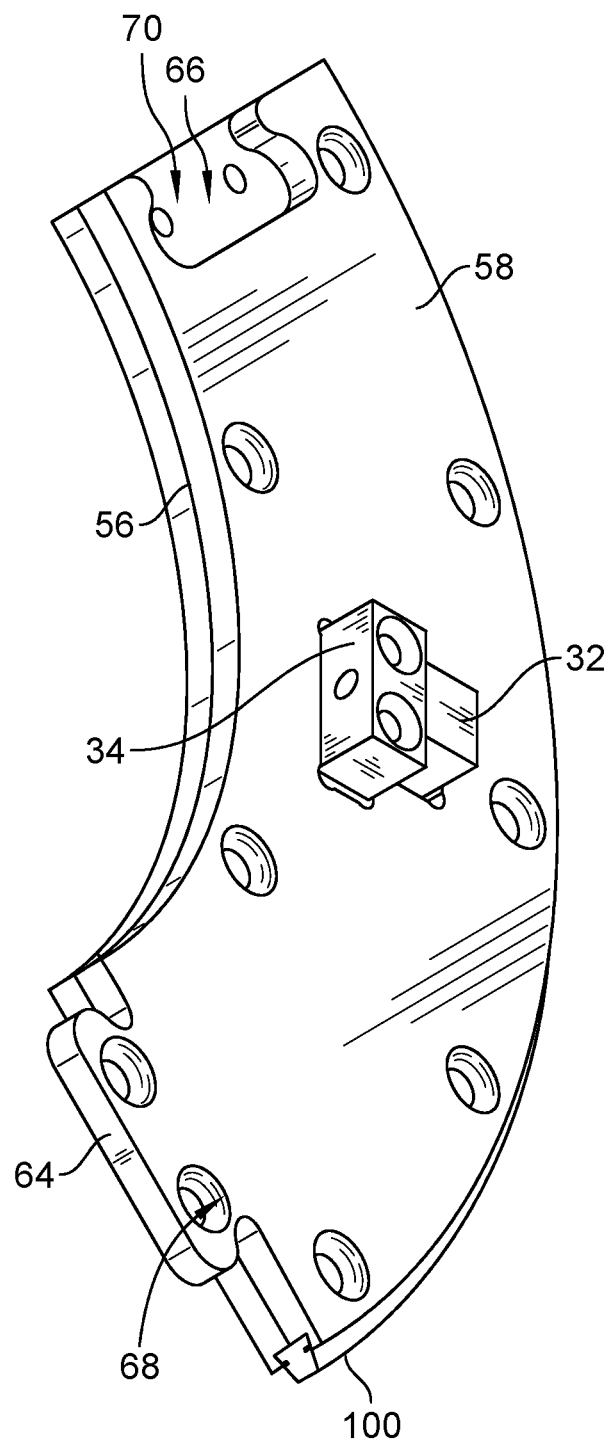
Figure 16:
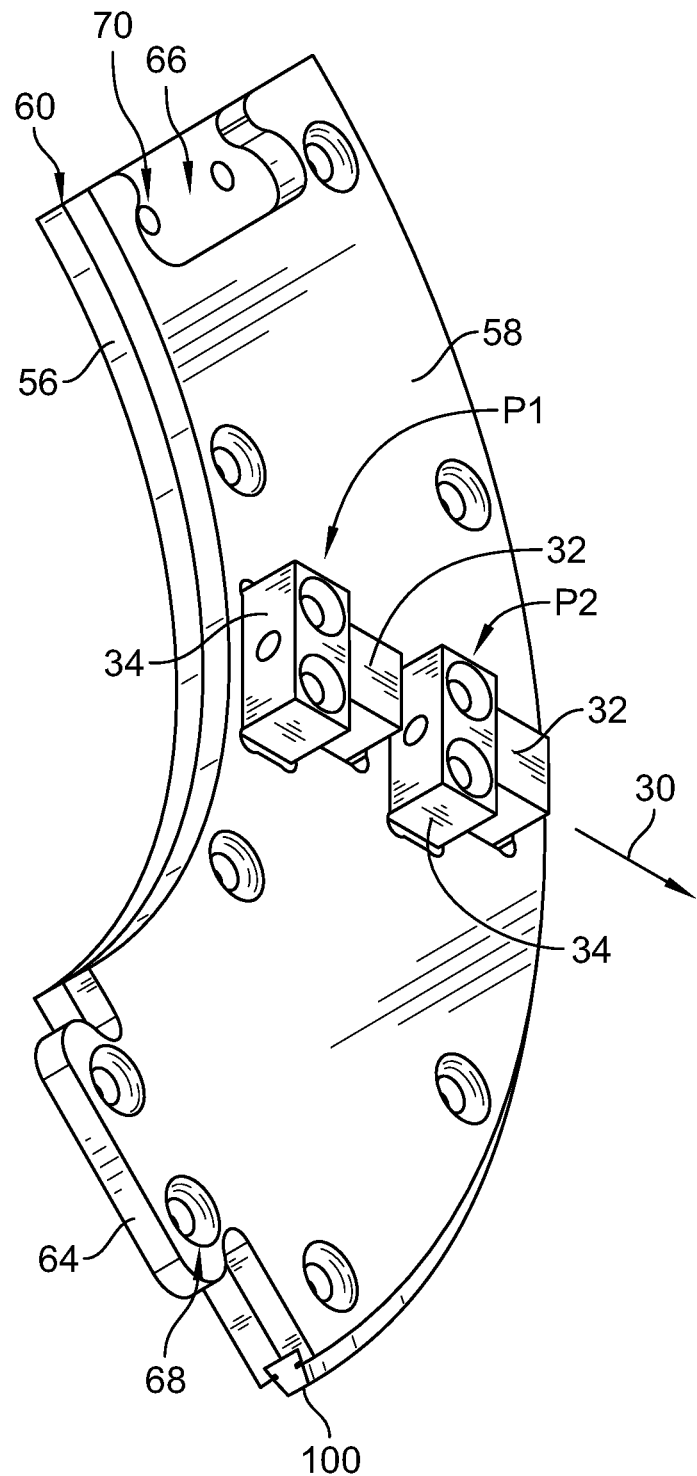
FIG. 16 shows an alternative embodiment of the attachment shown in part and in the disassembled state.

The fastening device 24 can also be so configured that the detachable fastening means 32 in at least two positions P1 and P2 which are arranged offset relative to one another in the radial direction 30 can each be connected to the base body 20 in positions P1 and P2 which are adapted to a specific rim diameter (see FIG. 16, which shows such an exemplary embodiment in a representation corresponding to the representation of FIG. 2).

Advantageously, the fastening device 24 is so configured that it is adaptable in respect of a rim diameter. This can be achieved, for example, via fastening means 32 which are movable, in particular as shown in FIG. 1 displaceable, in the radial direction 30.

In FIG. 1, the fastening means 32 of the fastening device 24 are each detachably fastened to holding lugs 34. The fastening of the fastening means 32 to the holding lugs 34 is so configured that the fastening means 32 are displaceable in the radial direction relative to the base body 20, or relative to the holding lugs 34. The holding lugs 34 are fixedly connected to the base body 20. As a result of the displacement of the fastening means 32, the attachment 10 can be adapted to different rim diameters. It is, however, also conceivable to achieve an adaptable fastening device 24 by pivoting fastening means 32. Preferably, however, the fastening means 32 are displaceable in the radial direction 30 as well as in the axial direction 28 relative to the base body 20 or relative to the holding lugs 34.

The fastening means 32 can be spring mounted relative to the holding lugs 34. Likewise, the holding lugs 34 can be spring mounted relative to the base body 20.

It is additionally advantageous if the fastening device 24 comprises a coupling mechanism 36. This coupling mechanism 36, as is shown schematically in FIG. 1, for example, can couple a movement of at least two movable, preferably (as shown in FIG. 1) all of the movable, fastening means 32 in the radial direction 30 and/or in the axial direction 28. Preferably, the coupling mechanism 36 is so configured that the movement of the coupled movable fastening means 32 is uniform, that is to say they move radially (or axially) inwards or radially (or axially) outwards at the same speed. Such a coupling mechanism 36 can be combined with all the embodiments described here which comprise fastening means 32, and such combinations are subject-matter of the present invention.

Figure 8:
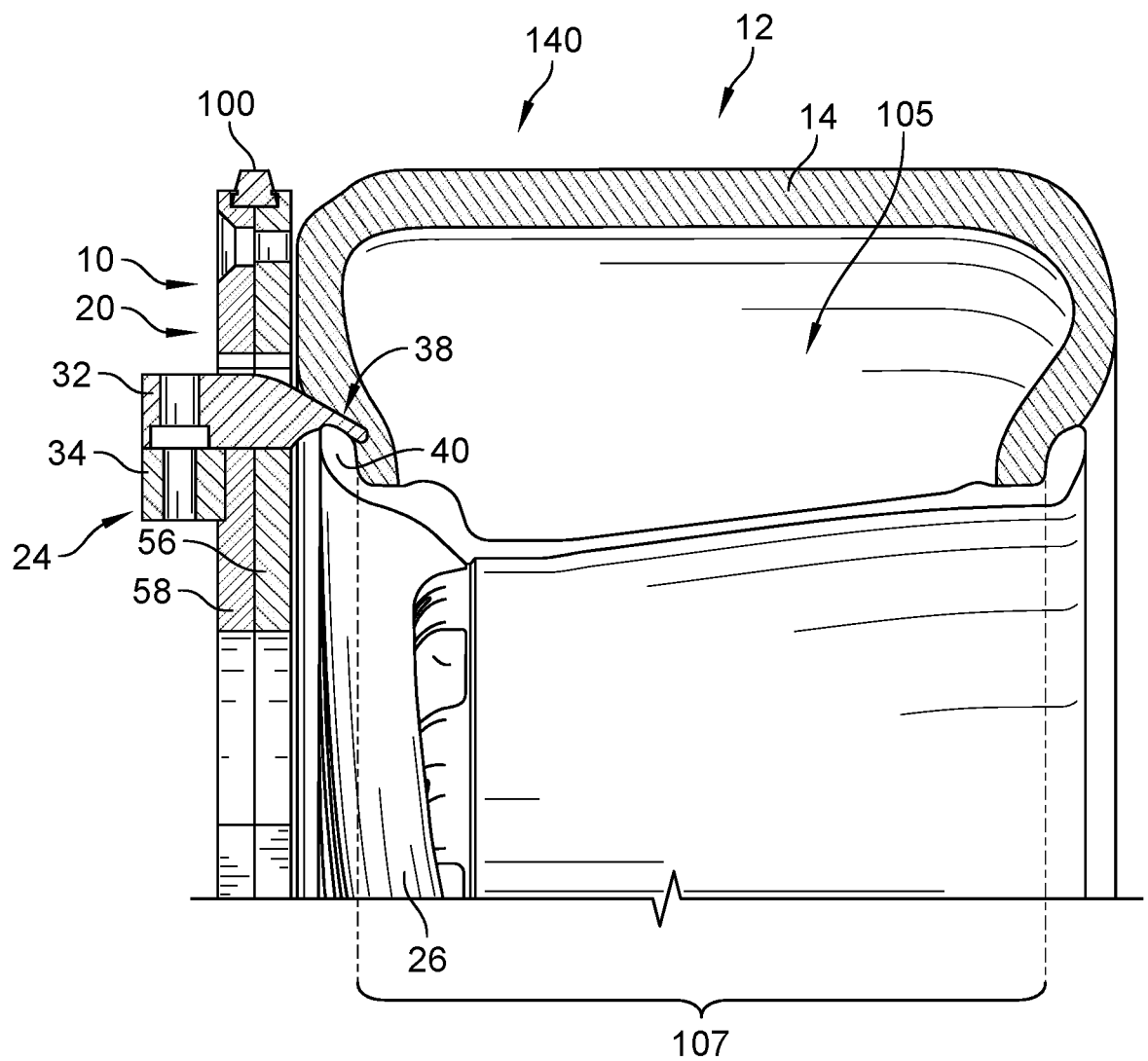

In a preferred embodiment (as is to be seen, for example, in FIGS. 3, 4A, 4B, 8 and 9A-9B), the fastening device 24, or the fastening means 32 thereof, comprise or comprises a hook portion 38 which is configured to engage behind a portion 40, in particular a rim flange 40, of the rim 105 of the vehicle wheel 12 (this engagement is shown, for example, in FIG. 8).

Preferably, the fastening device 24 has a contact portion 42 or a plurality of contact portions 42 (the contact portions 42 are clearly visible in FIG. 3, for example), which is preferably arranged on the hook portion 38. The contact portions advantageously have a resilient, elastic coating 44 which serves to prevent damage to the portion of the rim 105, in particular of the rim flange 40.

Figure 3:
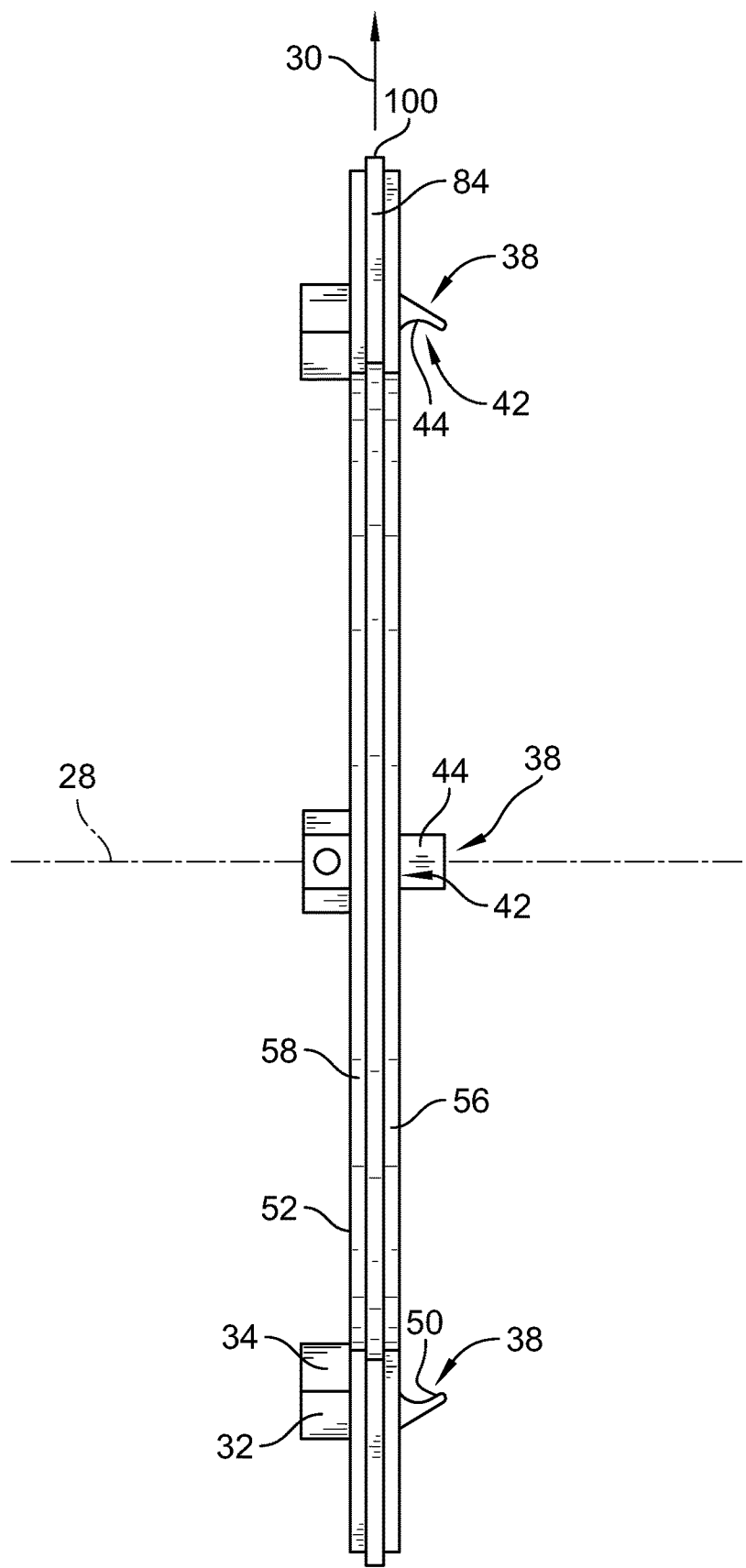
Figure 4A:
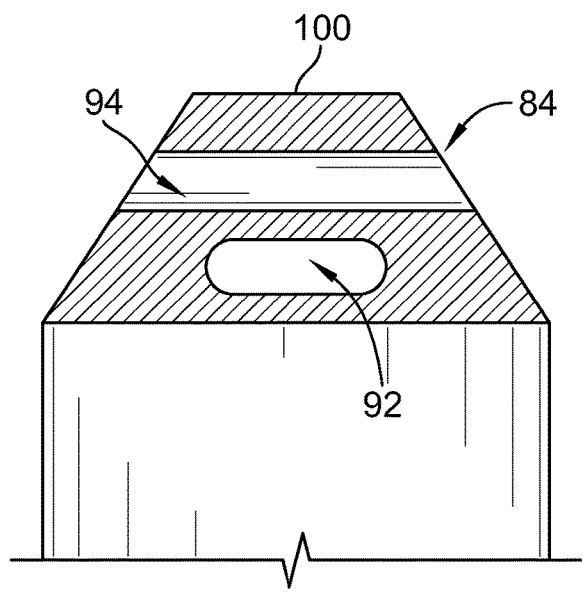
Figure 4B:
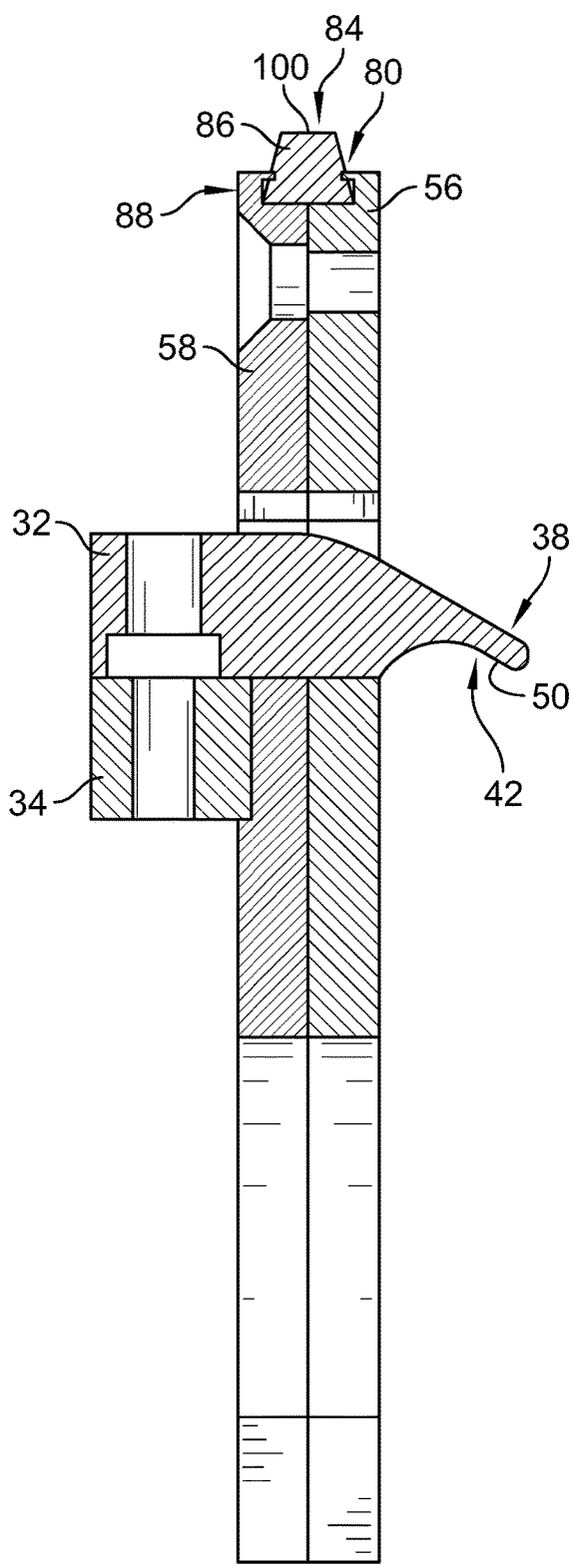
Figure 5:
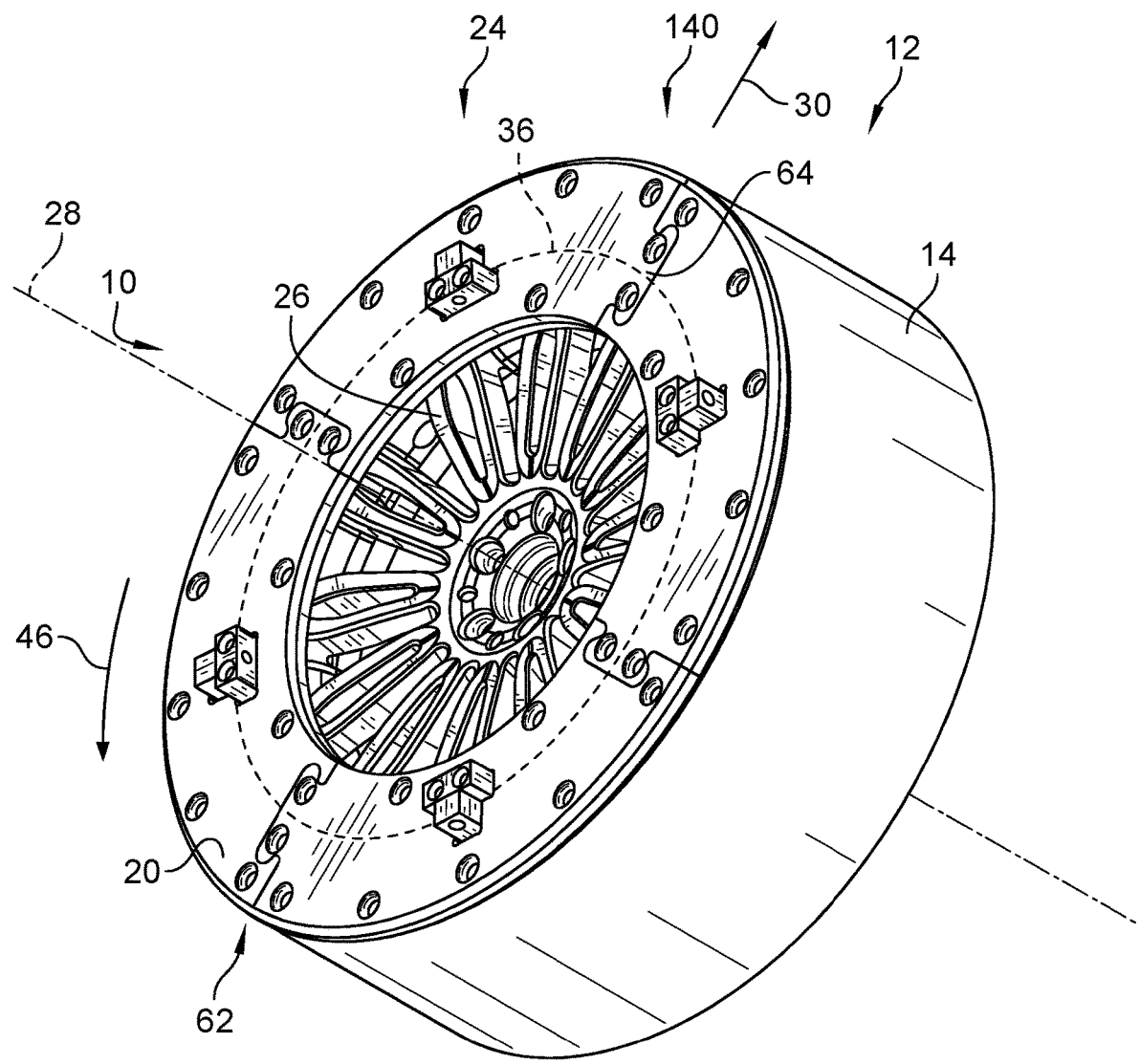
FIGS. 5 to 8 show the attachment of FIG. 1 in the state mounted on the vehicle wheel in different views(in FIG. 8 cut along the line VIII-VIII from FIG. 6)
Figure 6:
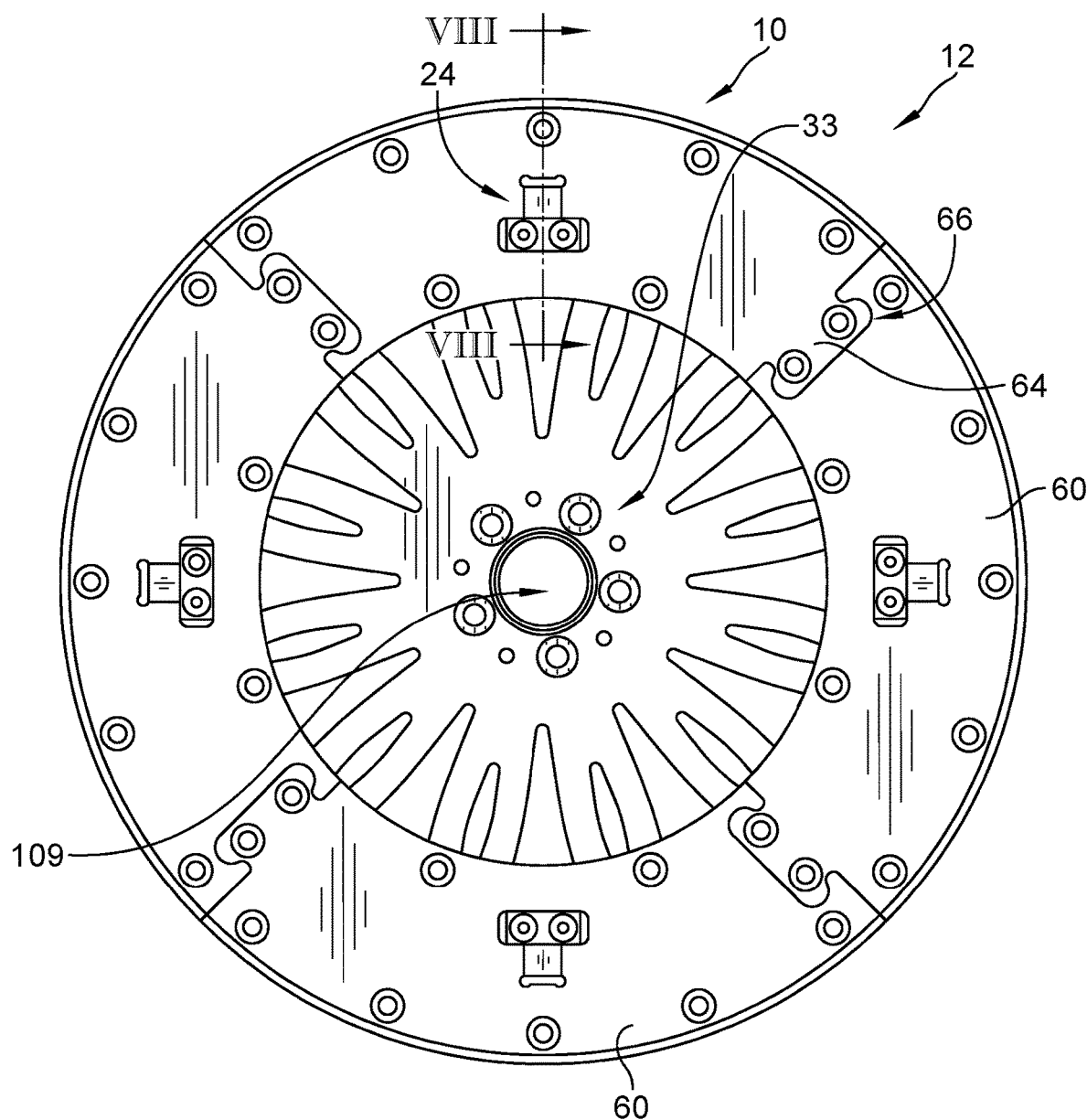
Figure 7:
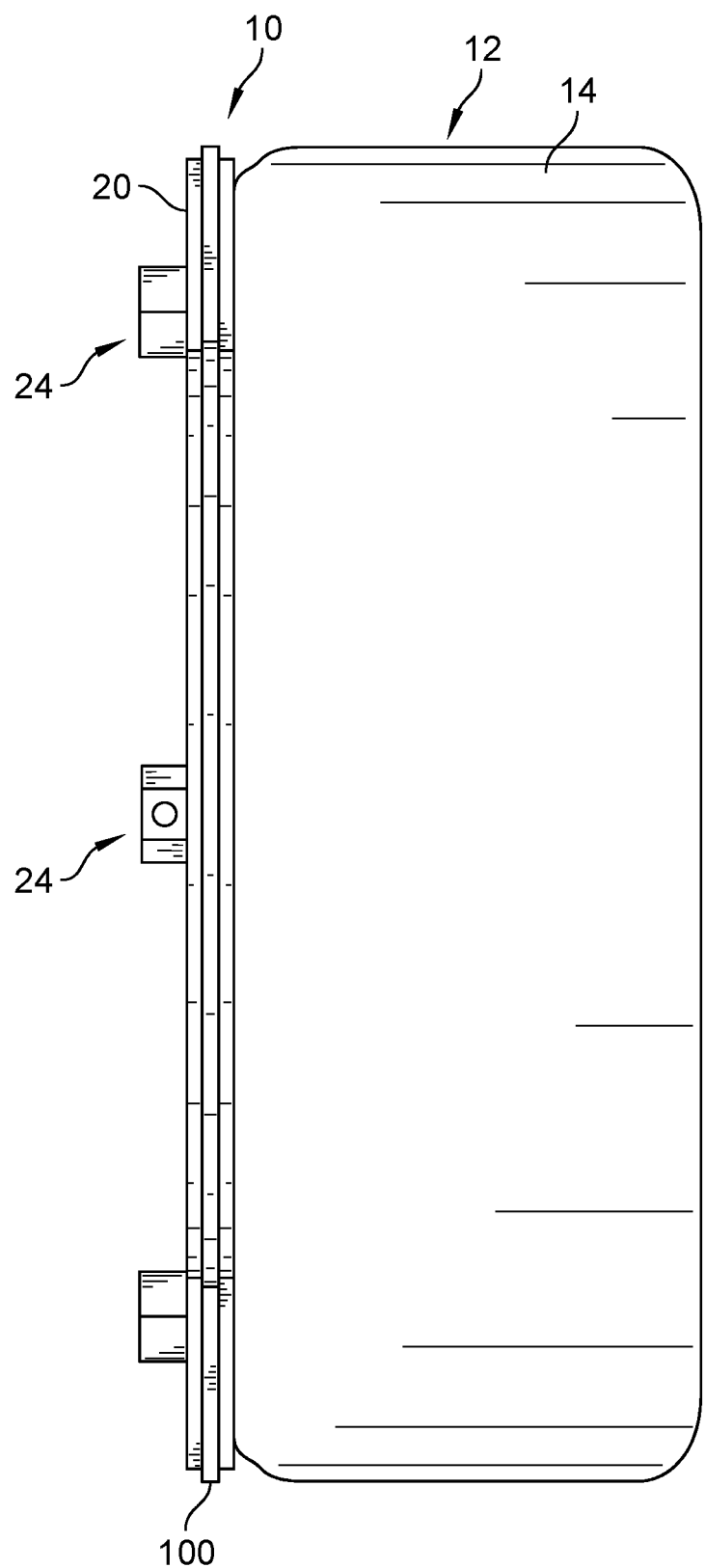
Figure 9B:
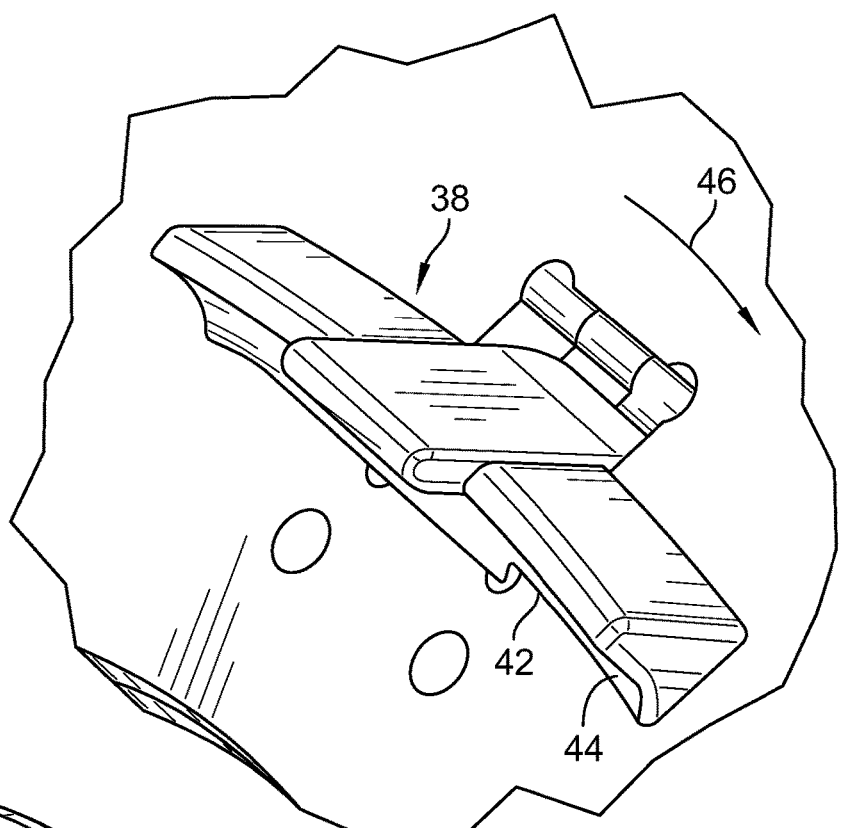
FIGS. 9A and 9B shows a detailed representation of an alternative embodiment of fastening means of the attachment.
Figure 9A:
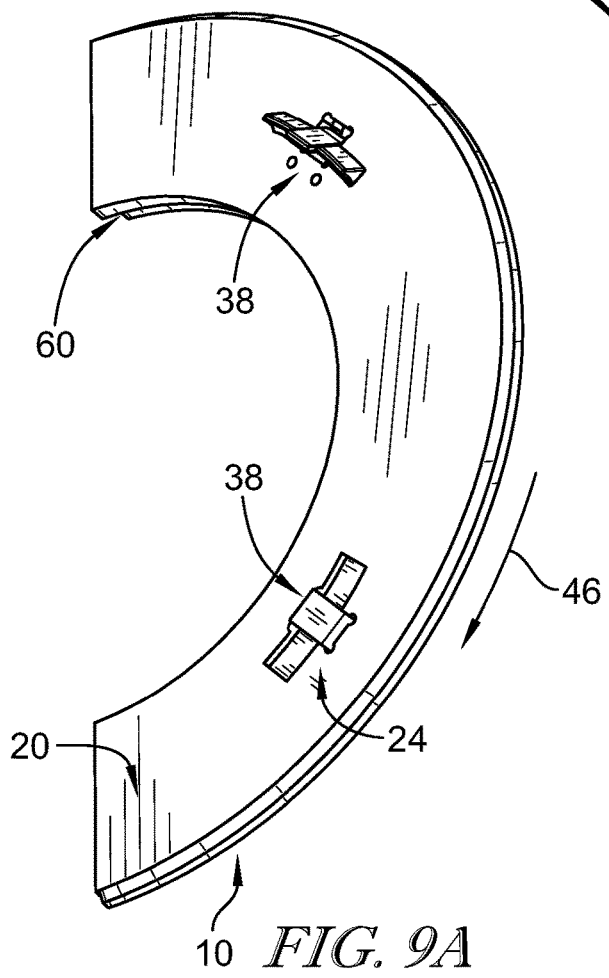
Figure 10:
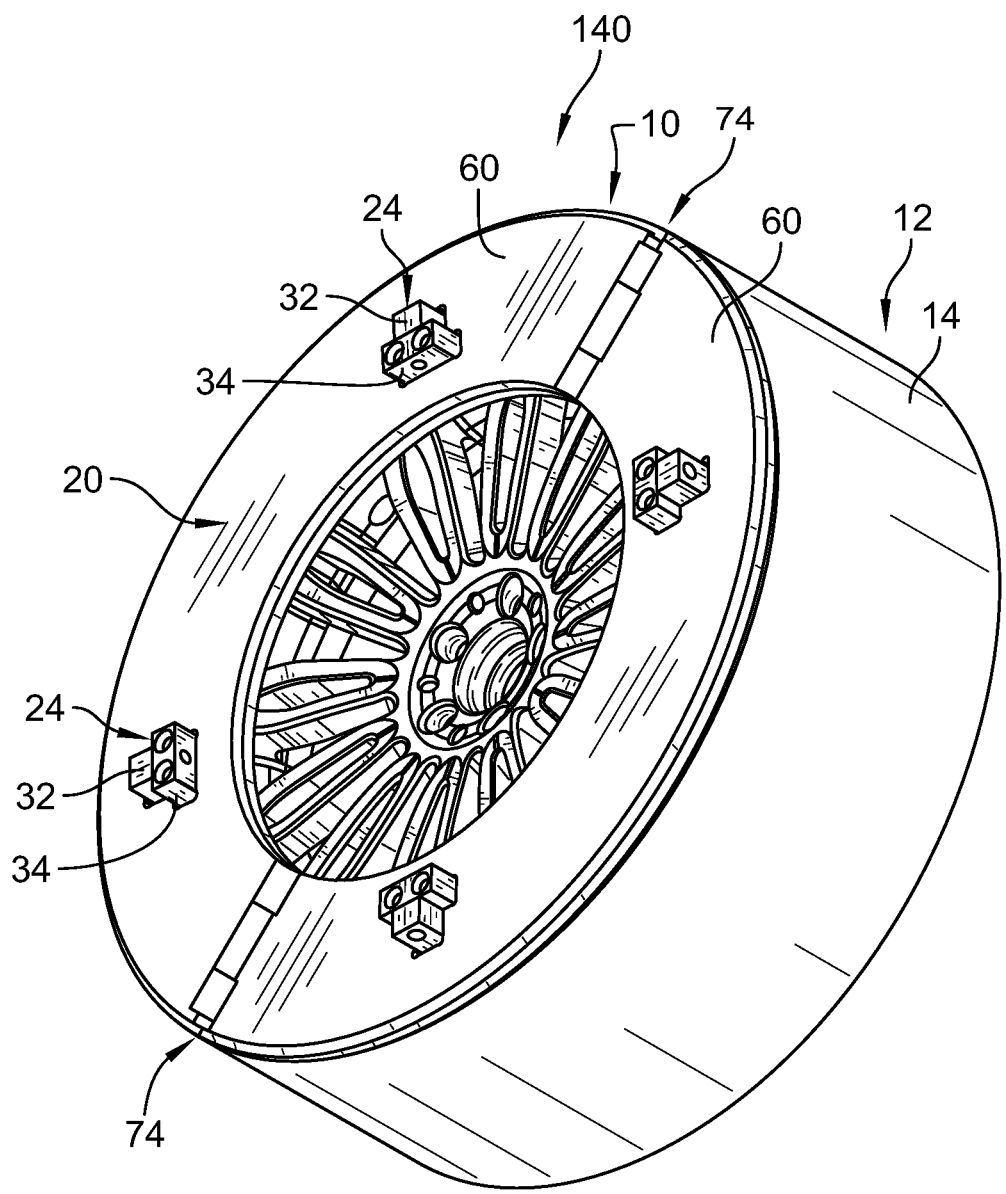
FIGS. 10 and 11 show an alternative embodiment of the attachment in the state mounted on the vehicle wheel (FIG. 10) and shown in part and in the disassembled state (FIG. 11)
Figure 11:
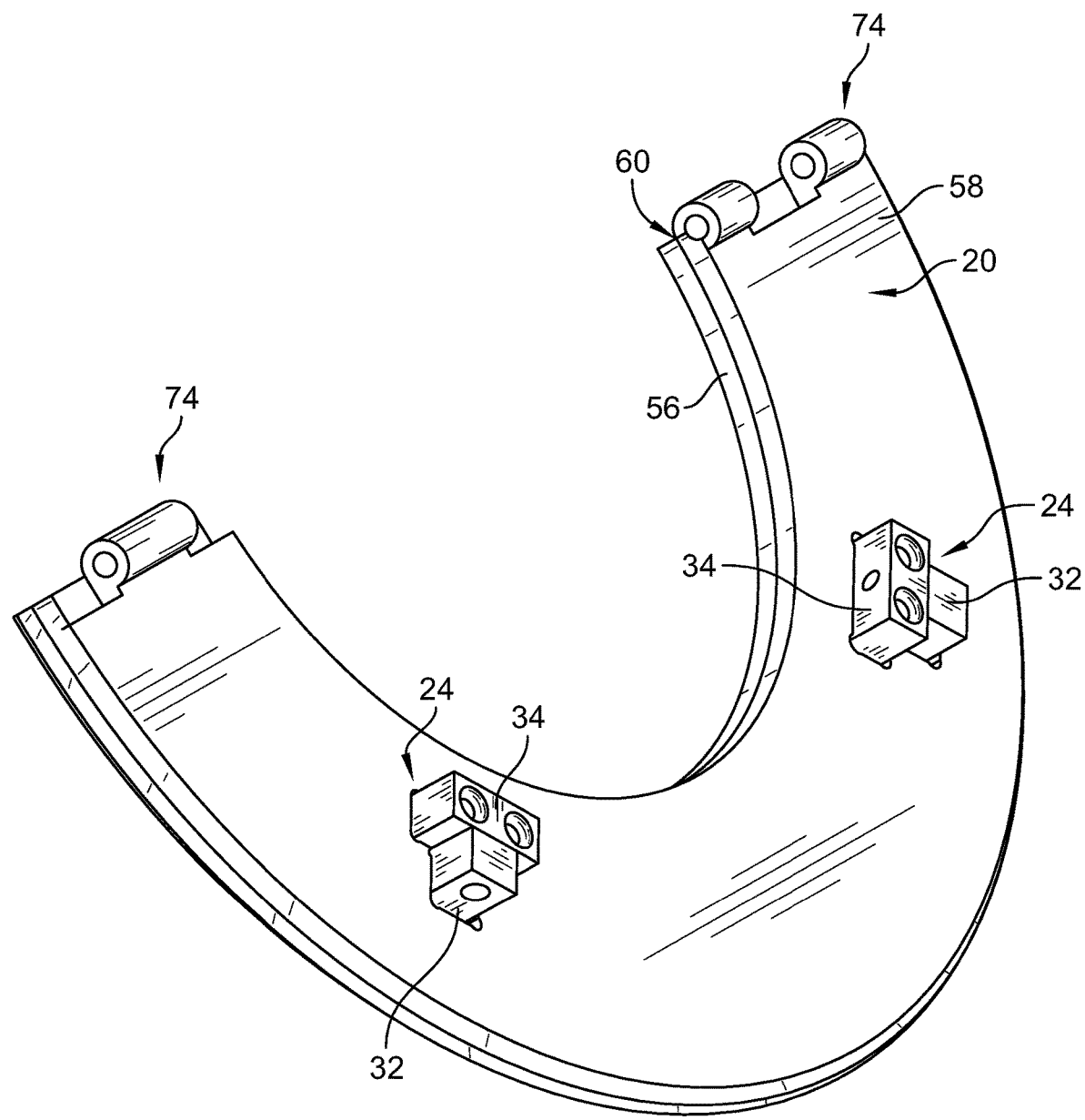
Figure 12:
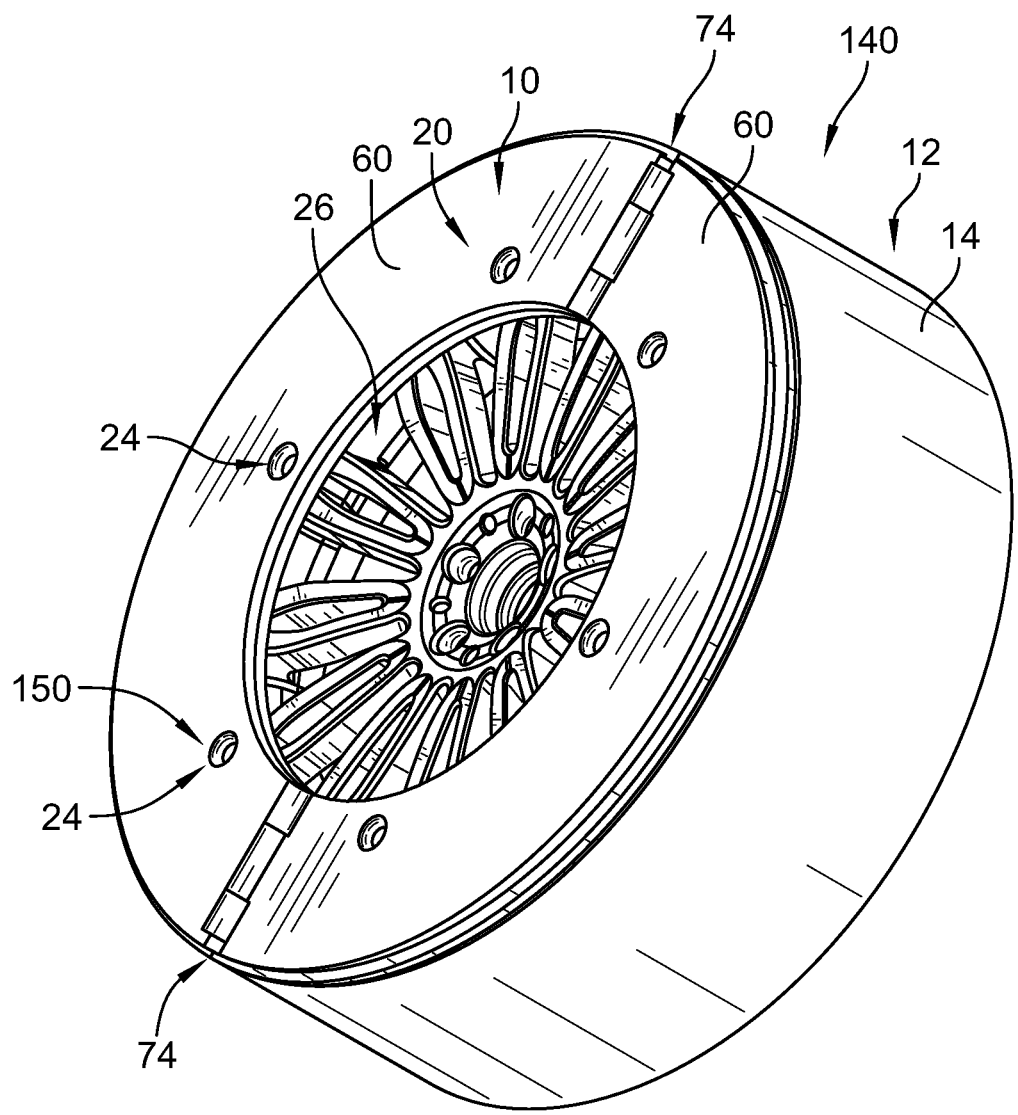
FIGS. 12 to 15 show an alternative embodiment of the attachment in the state mounted on the vehicle wheel (FIGS. 12 to 14.
Figure 13:
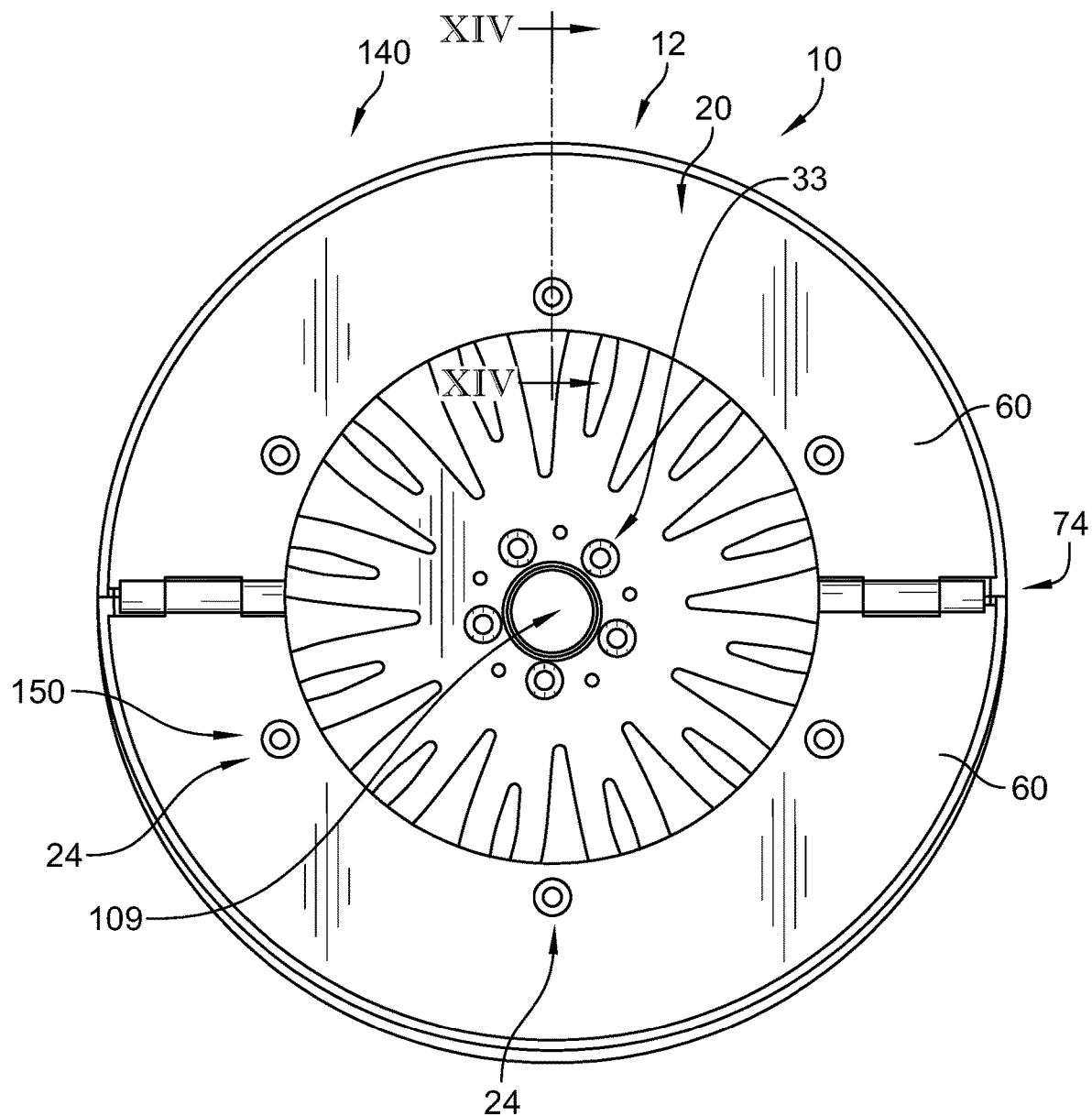

The contact portion 42, or the hook portion 38, can, as is clearly visible in FIG. 3 and also in particular in FIGS. 9A and 9B, be configured to be curved in a circumferential direction 46, in order to conform to, or rest flat against, the rim flange 40 when the attachment 10 is mounted on the rim 105.

The fastening device 24 is preferably so configured that it contacts, in particular via the hook portions 38 and/or the contact portions 42, the rim 105, in particular the rim flange 40, over at least a sixth (see FIGS. 9A and 9B), preferably a quarter, preferably a third, preferably half, of the circumferential extent thereof when the attachment 10 is mounted on the vehicle wheel 12.

In the embodiment of FIGS. 9A and 9B, the fastening means 32 have prolongations which are extended and curved in the circumferential direction 46 and which permit broad, flat contacting of the rim flange 40, so that the contact portions 42 of the respective fastening means 32 rest on the rim flange 40 over at least a sixth of the circumferential extent thereof.

The fastening device 24 is preferably so configured that the attachment 10, on fastening to the rim 105 of the vehicle wheel 12, is urged in the axial direction 28 towards the wheel disc 26 (see, for example, the curved form of the hook portions in FIG. 3).

Such urging of the attachment in the direction of the wheel disc 26 is preferably achieved by a corresponding form of the fastening means 32 or the contact portion 42 of the fastening device 24, in particular the hook portion 38.

The fastening device 24 advantageously comprises at least one clamping surface 50 which, when seen in the axial direction 28, slopes radially inwards, preferably in a linear or arcuate manner, wherein the fastening device 24 is so configured that the clamping surface 50, on fastening of the attachment 10 to the rim 105 of the vehicle wheel 12, moves, in particular is displaced, radially inwards, and the clamping surface 50 is so configured that the attachment 10, on fastening to the rim 105 of the vehicle wheel 12, is urged in the axial direction 28 towards the wheel disc 26.

Such a clamping surface 50 is configured, for example in FIG. 3, as part of the contact portions 42 or of the hook portions 38. In the embodiment shown in FIG. 3, the clamping surfaces 50 are so curved that the attachment 10, when the fastening means 32 move radially inwards on mounting of the attachment 10 on the rim 105, is urged by the curve of the clamping surfaces 50 in the axial direction 28 towards the vehicle wheel 12. To that end, the clamping surfaces 50 do not, however, have to be curved, as shown in FIG. 3. They can also be, for example, straight and slope radially inwards, when seen from an outer side 52 of the attachment 10. For the function of the clamping surfaces 50, it is sufficient that they slope radially inwards when seen from the outer side 52 of the attachment 10, looking in the axial direction 28.

The base body 20 can, as can be seen, for example, in FIG. 3, comprise a rim-side part 56 and a part 58 which is remote from the rim and can be detached from the rim-side part.

The base body 20 can thus, for example in the embodiment of FIG. 3, be divided into two parts 56 and 58 having largely the shape of an annular disc.

The base body 20, or optionally the rim-side part 56 and the part 58 remote from the rim, advantageously comprises or comprise at least two circumferential segments 60.

In the example of FIG. 1, the rim-side part 56 and the part 58 remote from the rim each comprise four circumferential segments 60. One of these circumferential segments 60 of the attachment 10, which is shown in FIG. 1, is shown in FIG. 2 in a detailed representation.

In the case of the attachment 10 shown in FIG. 1, the circumferential segments 60 are connected together by an interlocking holding means 62. A prolongation 64 in dovetail form in the circumferential direction 46 is thereby inserted into a corresponding recess 66 of the adjacent segment 60. Via screw holes 68, screws can be screwed into corresponding screw receivers 70 on the recess 66 and the segments 60 thus fixedly connected together. The use of screws in combination with the screw holes 68 and the screw receivers 70 is not essential; instead, other fastening mechanisms, such as, for example, clips or clamps, can also be used.

The holding means 62 shown, for example, in FIG. 1 having the prolongations 64 in dovetail form and the corresponding recesses 66 represents a possible embodiment of an engagement structure 70 in the circumferential direction 46 for the detachable connection of the circumferential segments 60.

The circumferential segments 60 can also be connected together in the circumferential direction 46 via a, preferably detachable, folding mechanism 74. Such an embodiment is shown, for example, in FIG. 10.

It is advantageous if the rim-side part 56 and the part 58 remote from the rim, or a segment 60 of each of the rim-side part 56 and the part 58 remote from the rim, form in the assembled state a receiving portion 80 in which a tread body 84, or a segment 86 of the tread body 84 (which in respect of its circumferential extent is formed corresponding to the circumferential segments 60 of the base body 20), can be inserted on assembly into the assembled state in such a manner that it is held in an interlocking manner, in particular via an interlocking engagement 88.

Preferably, the attachment 10 is formed with a tread body 84 which is shock-absorbing.

Figure 22:
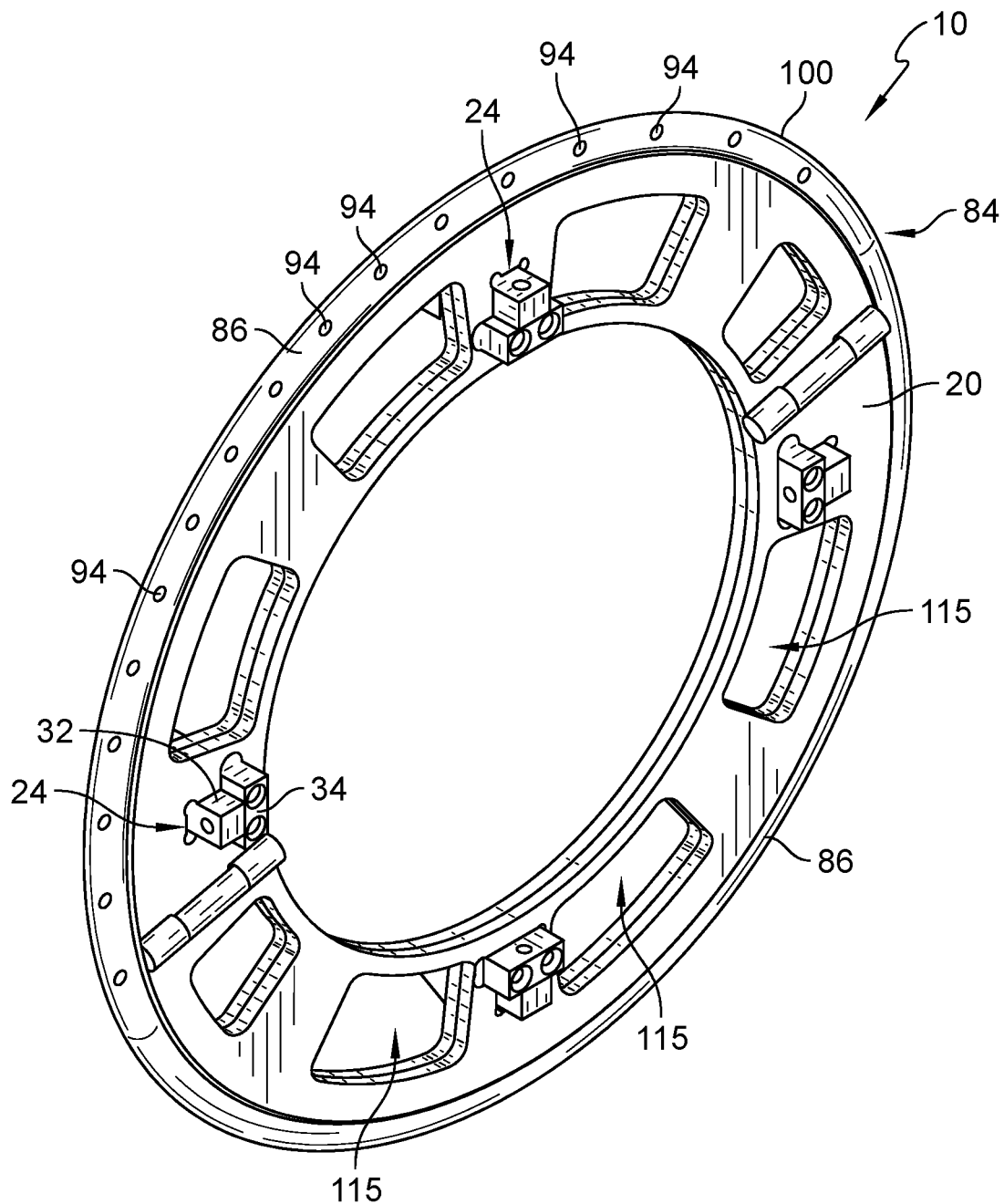

Preferably, the tread body 84 is formed of an elastically resilient material, for example rubber or another elastically resilient polymer. Alternatively or in addition, the tread body 84 can also have an elastically resilient structure, in particular a structure comprising voids 92 and/or holes 94 or openings 94 (see FIG. 4A). In FIG. 22, one of the segments 86 of the tread body 84 is shown with such openings 94 and a further segment 86 of the tread body 84 is shown without such openings 94. Preferably, however, the tread body 84 is uniform over its entire circumferential extent, that is to say formed either with openings 94 or without openings 94.

A running surface 100, that is to say the contact surface of the attachment 10 with the road, can be formed by the tread body 84, or the radially outer surface thereof.

In an embodiment variant, as is shown, for example, in FIGS. 17 to 19, a radially outer running surface 100 of the attachment 10 extends, when seen in the direction of the vehicle wheel 12 in the axial direction 28, into a rim mouth of the rim 105, when the attachment 10 is fastened to the rim 105 of the vehicle wheel 12. In FIG. 8, the rim 105 is marked with a corresponding reference numeral, and a rim mouth is designated with reference numeral 107. The form with such a running surface 100 can of course also be combined with the segments 60 which are detachably connected together, as shown, for example, in FIG. 1.

The attachment 10 can also have an additional fastening element 110. The additional fastening element 110 is provided to fasten the attachment 10 in the middle region of the wheel disc 26. To that end, the additional fastening element 110 can be configured, for example, to fasten the attachment 10 to the wheel disc 26 in the region of the bolt circle 33, in particular at the bolt circle 33 (as shown in FIG. 20) and/or at a central opening 109 (the central opening 109 is provided with a reference numeral in FIG. 6, for example) of the wheel disc 26 and/or at a spoke 112 of the wheel disc 26.

Figure 20:
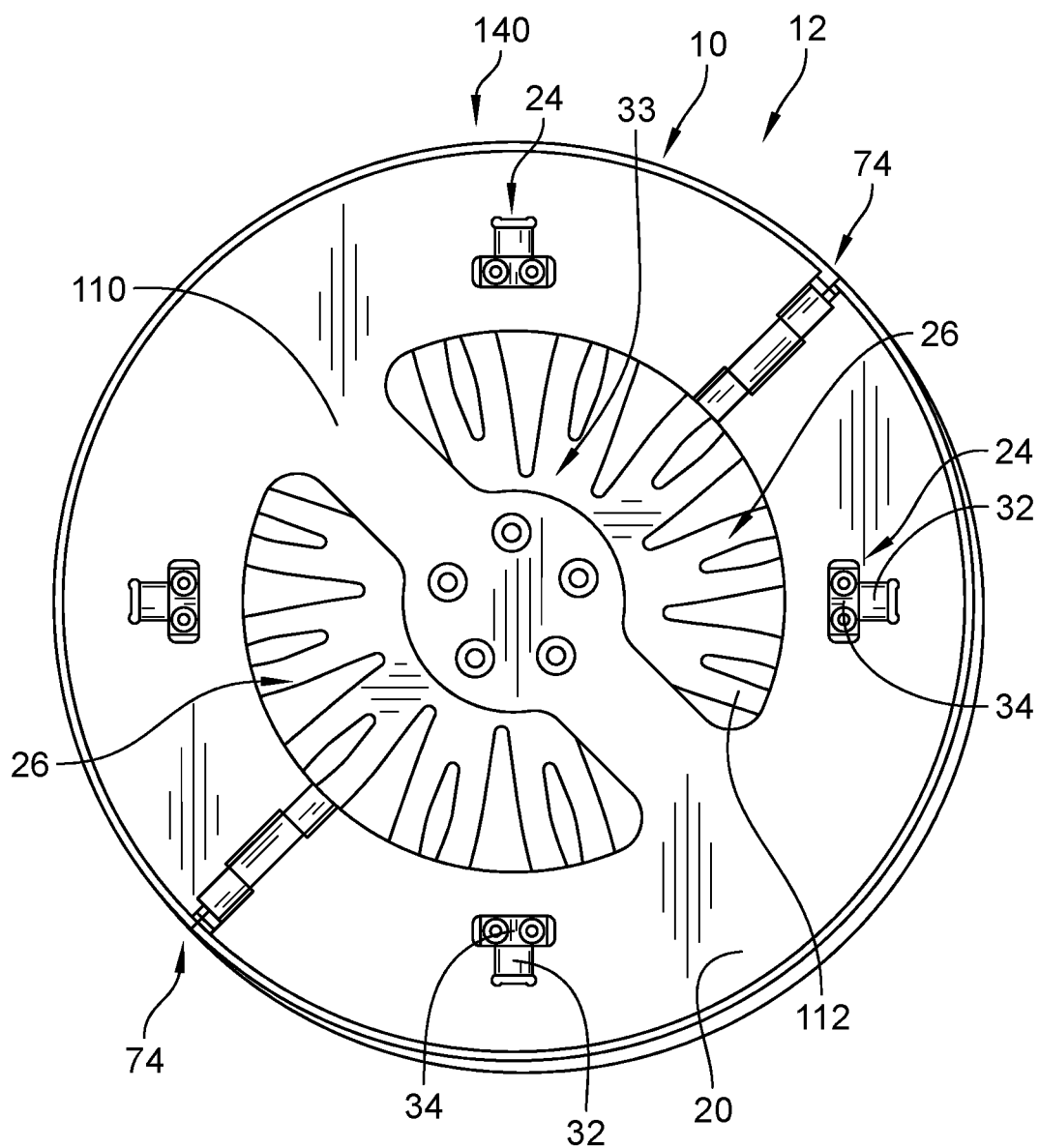
FIG. 20 shows an alternative embodiment of the attachment in the state mounted on the vehicle wheel.

Such an additional fastening element 110 can, as shown in FIG. 20, be formed in one piece with the base body 20 of the attachment 10. Alternatively, however, it is likewise possible for the additional fastening element 110 to be detachably fastened to the attachment 10. Preferably, the fastening of the additional fastening element 110 is such that the additional fastening element 110 is movable, preferably displaceable and/or pivotable, relative to the attachment 10.

For example, the additional fastening element 110 can be in such a form that it can be pushed into the base body 20 of the attachment 10 or it can be in foldable form. The additional fastening element 110 can also have a joint in the region of the bolt circle 32, so that it consists, for example, of two individual elements. The additional fastening element 110 can be combined with the different embodiments of the base body 20 of the attachment 10.

Figure 21:
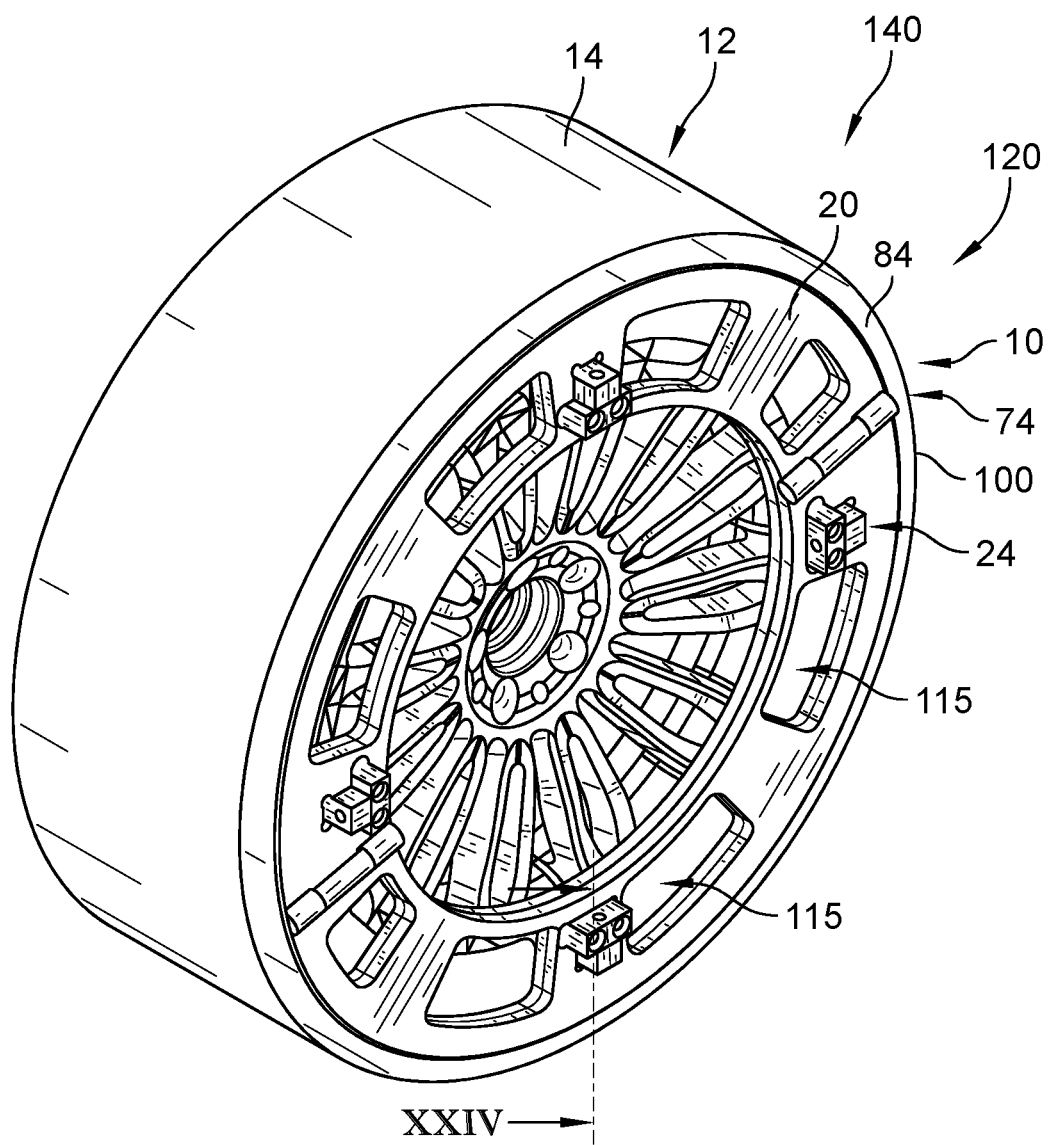
FIGS. 21 to 24 show an alternative embodiment of the attachment (FIG. 21 in the state mounted on the vehicle wheel, in FIG. 22 without the vehicle wheel, FIG. 23 without the vehicle wheel and folded, FIG. 24 cut along line XXIV from FIG. 21)
Figure 23:
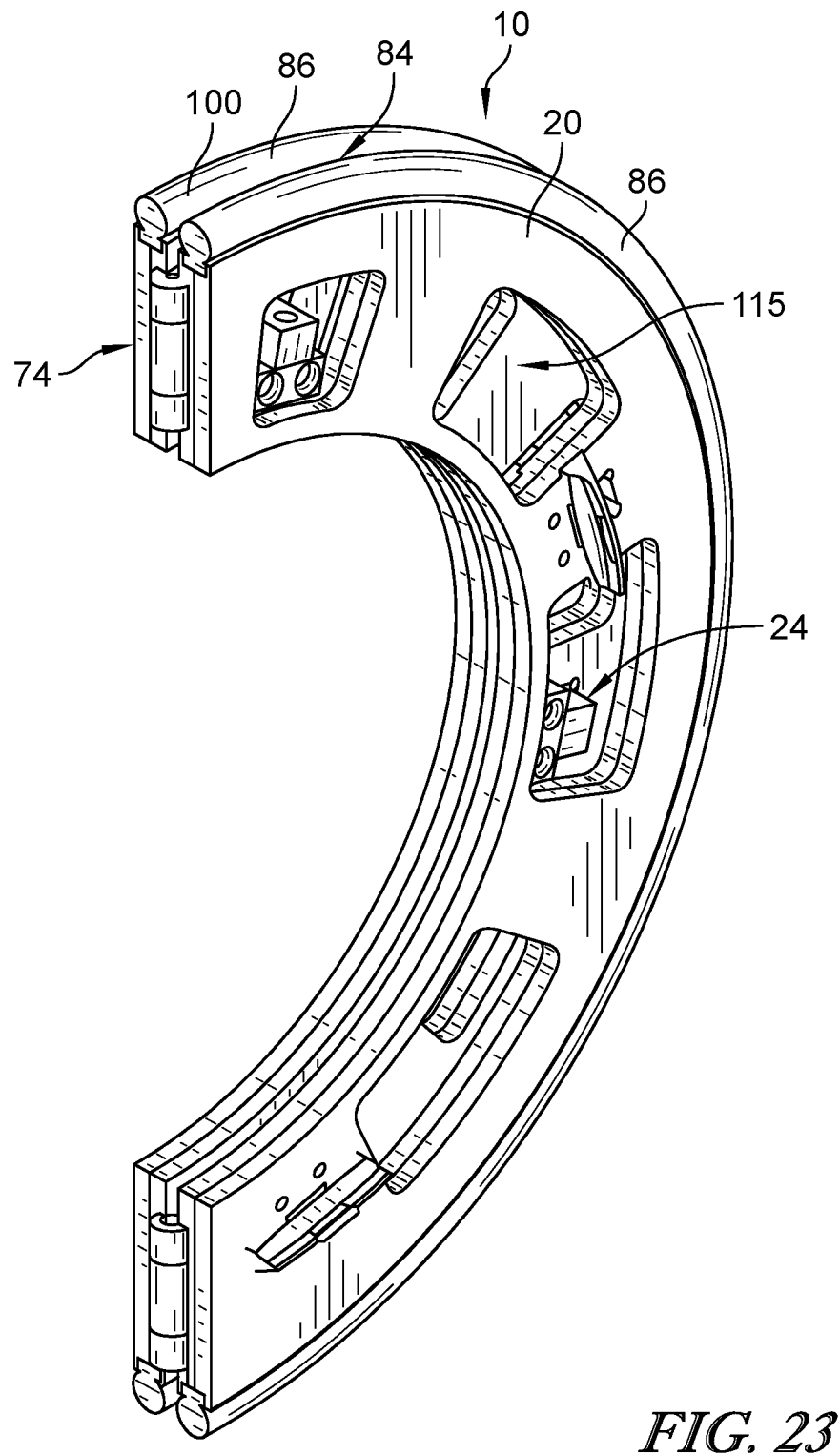

As is shown in FIGS. 21 to 23, it can be advantageous if the base body 20 has openings 115. These openings 115 can on the one hand reduce the weight of the base body 20 and thus of the attachment 10. On the other hand, these openings 115 can serve to make the attachment 10 easily foldable (see FIG. 23). In the folded state, elements protruding from the surface of the base body 20, such as, for example, the fastening device 24, can easily be folded into the openings 115 (see FIG. 23).

The present invention also provides an attachment set 120 for a vehicle wheel 12, characterized in that it comprises an attachment 10a for fastening to the rim 105 of the vehicle 12 on the vehicle side, and a further attachment 10b for fastening to the rim 105 of the vehicle wheel 12 on the side remote from the vehicle, wherein at least one of the two attachments 10a, 10b is configured as described above.

Figure 24:
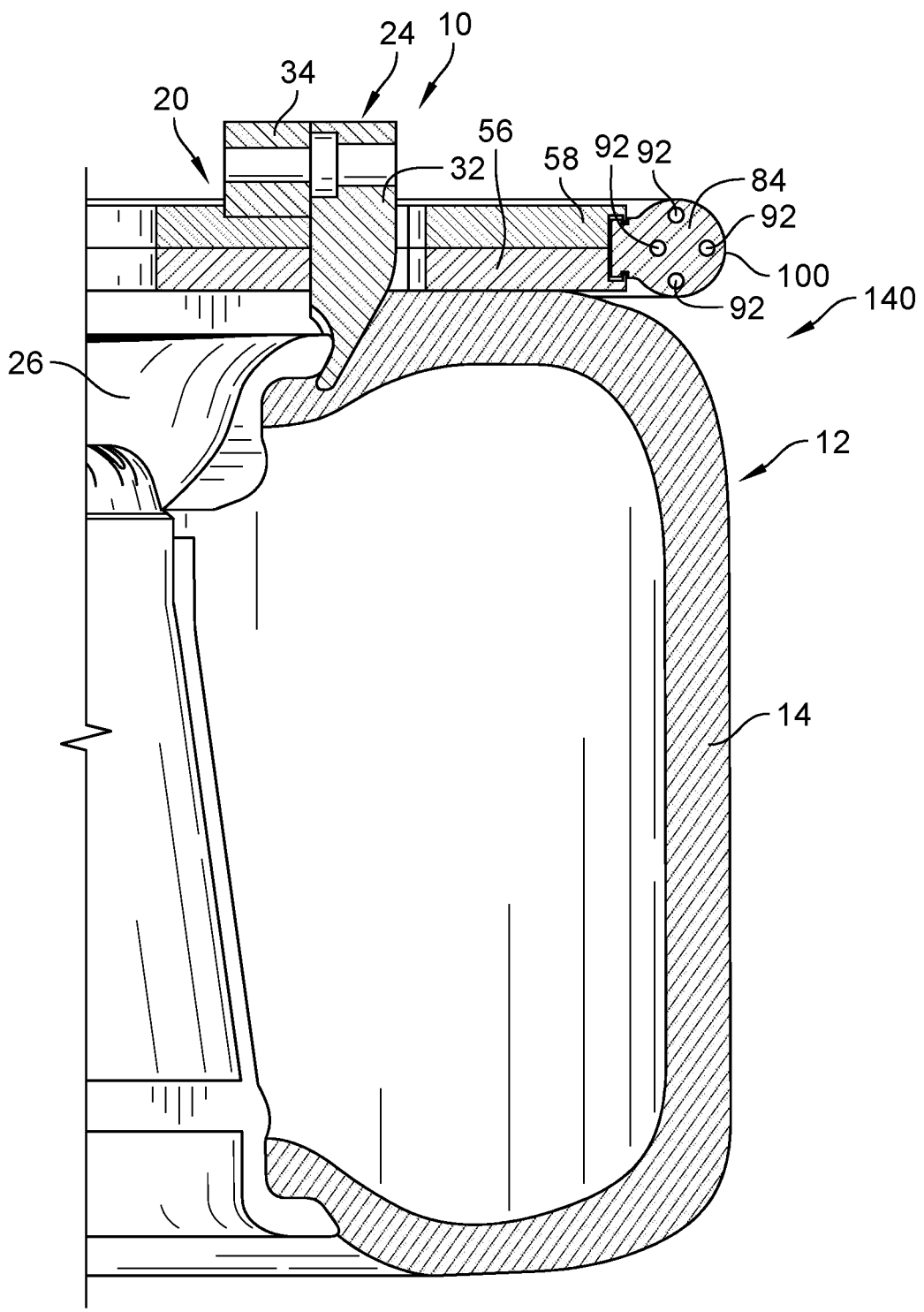
Figure 25:
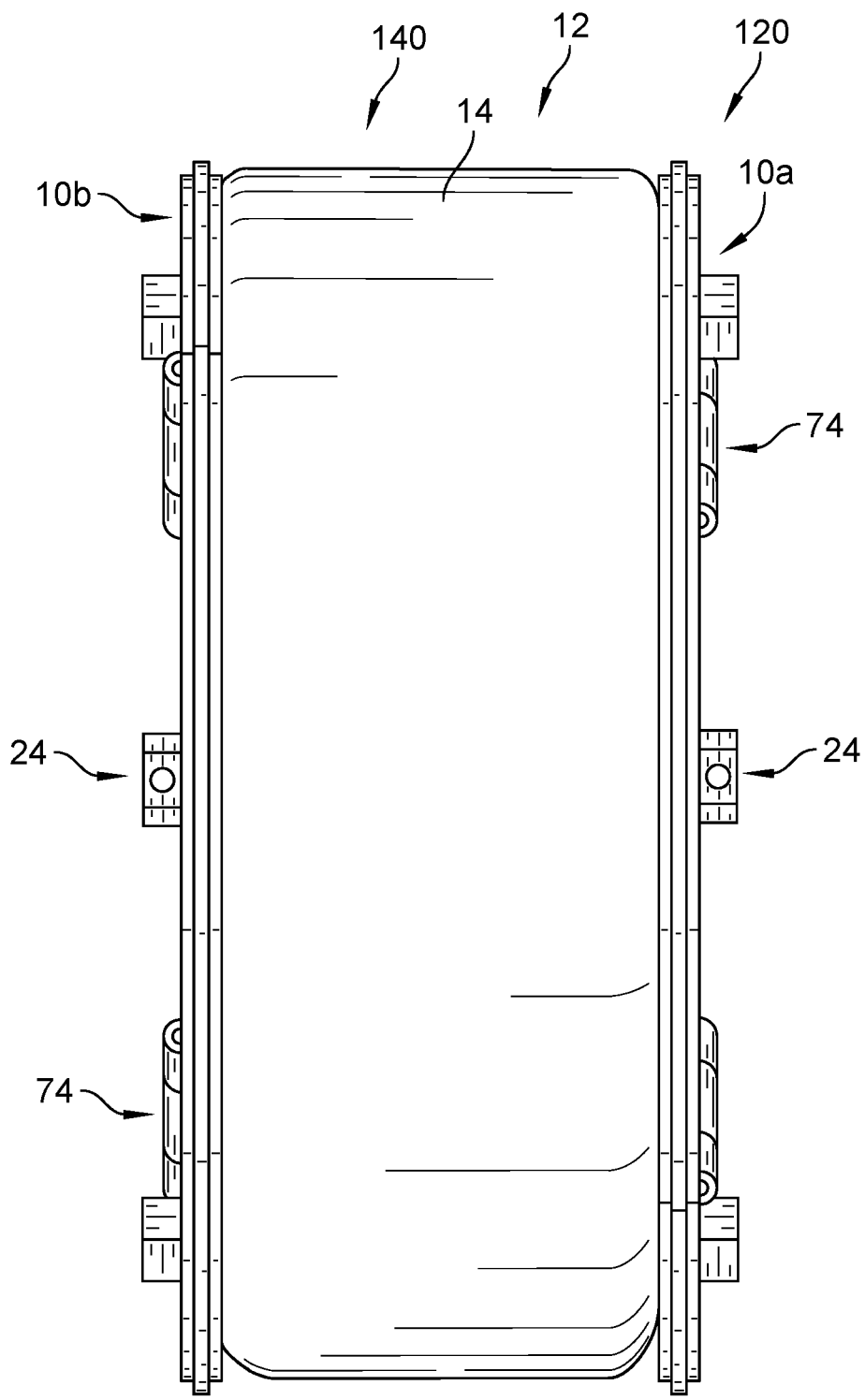
FIG. 25 shows an attachment set in the state mounted on a vehicle wheel.

Preferably, both attachments 10a, 10b, as shown in FIG. 24, are formed according to one of the further embodiments described herein.

Preferably, the attachment set 120 comprises a connecting element 130 with which the two attachments 10a, 10b of the attachment set 120 can be fastened, in particular clamped, in a loss-proof manner on opposite sides of the vehicle wheel 12 and mutually against the vehicle wheel 12, in order to permit final fastening via the fastening means 24. To that end, the connecting element 130 can be so configured, for example, that it can be hooked into the two attachments 10a, 10b. If the connecting element 130 is to clamp both attachments 10a, 10b against the vehicle wheel 12, then the connecting element 130 can be in such a form that it can be shortened via a screw mechanism or in such a form that it can be shortened by being pushed in. In the variant which can be shortened by being pushed in, pushing in should be possible with low resistance and removal should be possible only after actuation of a detachment mechanism, in order to prevent unintentional detachment. The connecting element 130 can also be in resilient form so that it is tensioned on fitting and then clamps the two attachments 10a, 10b against the vehicle wheel 12 by its residual stress.

The invention also provides a system 140 comprising a vehicle wheel 12 and an attachment 10 or an attachment set 120 for a vehicle wheel 12, wherein the attachment 10 or the attachment set 120 is configured according to one of the embodiments described herein.

Figure 14:
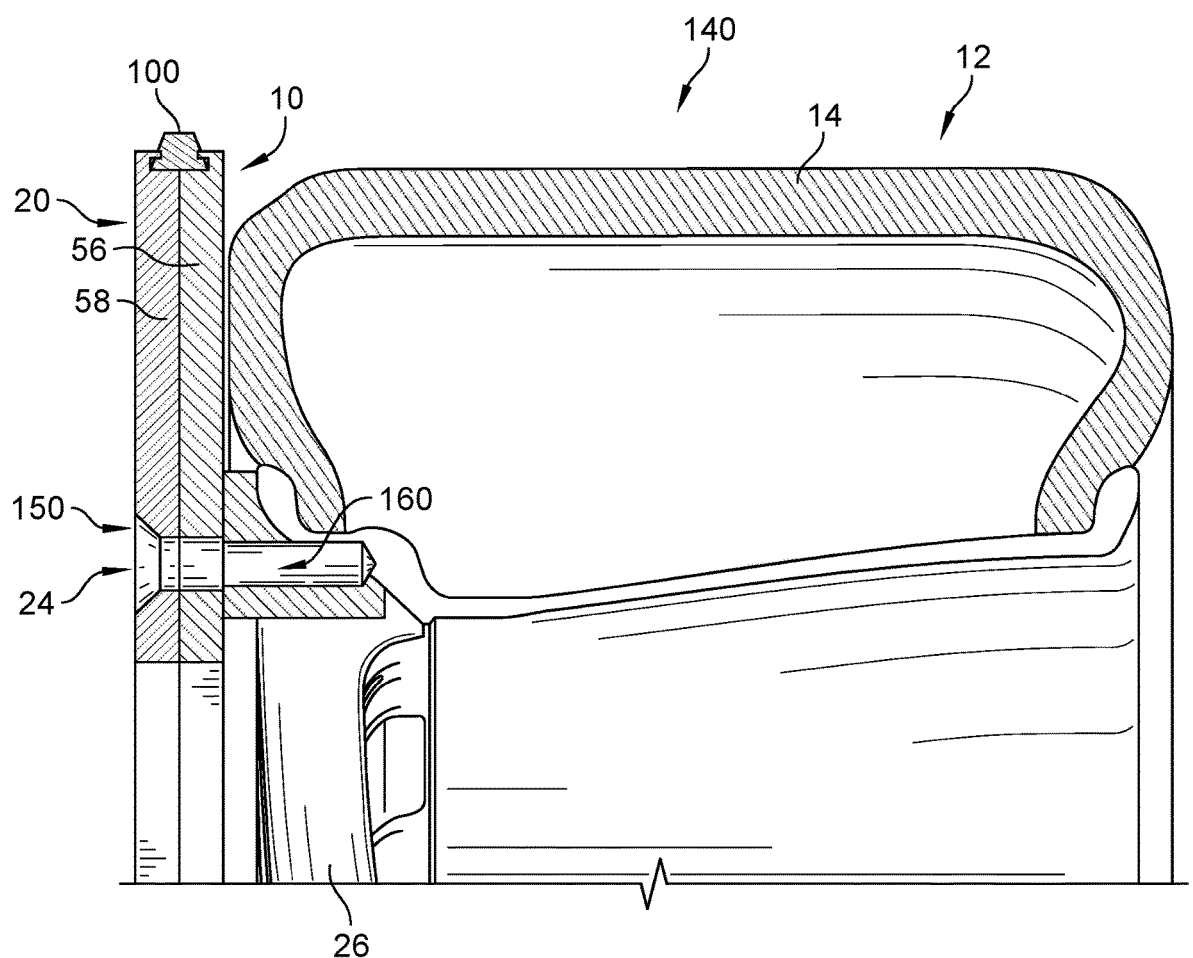
Figure 15:
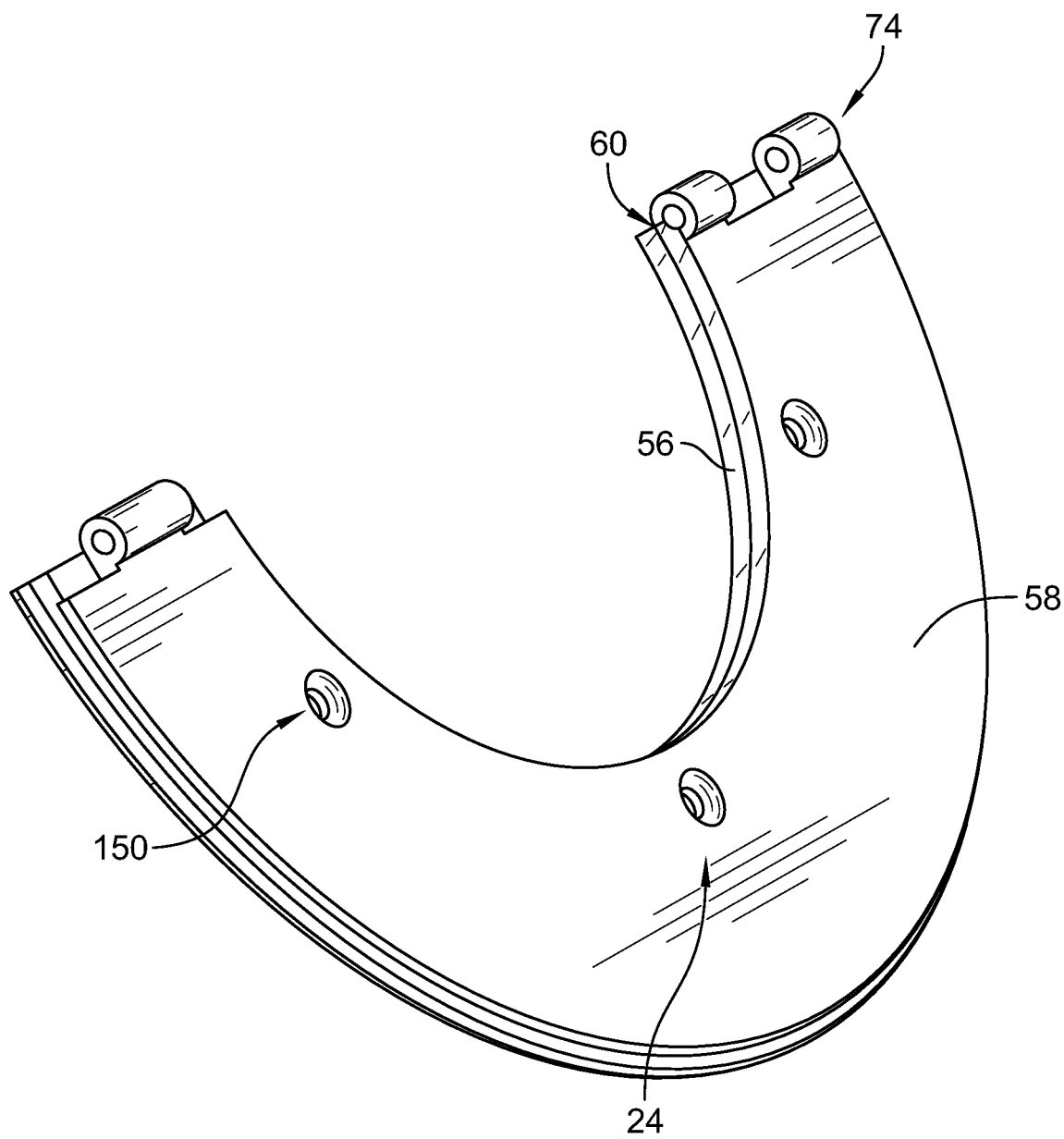
Figure 26:
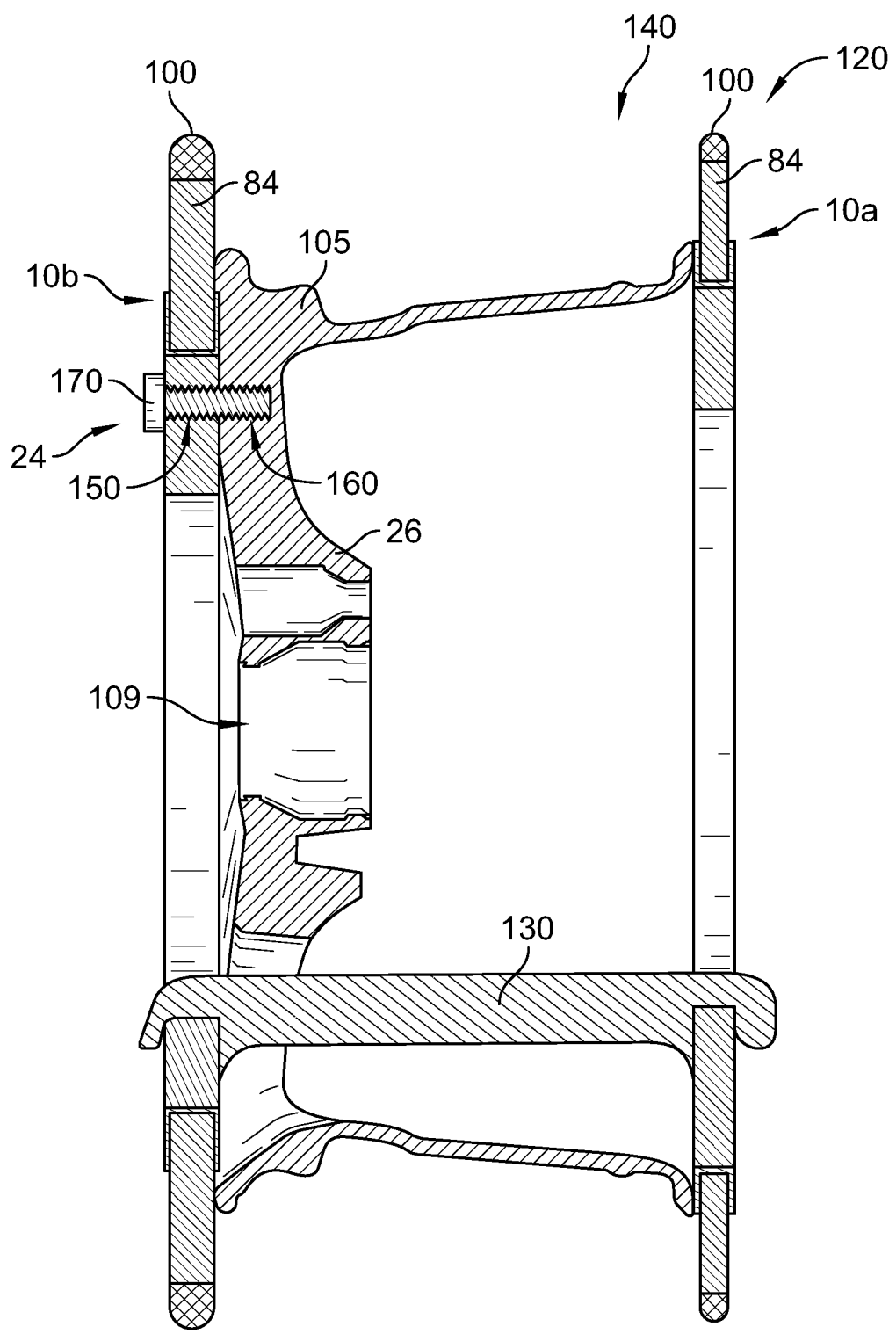
FIG. 26 shows an alternative embodiment of the attachment set in a schematic representation and in the state mounted on the vehicle wheel.

Preferably, in the system 140, the attachment 10, or at least one of the attachments has a recess 150 (see, for example, FIG. 14 or FIG. 26) via which the attachment 10 can be screwed to the wheel disc 26 of the vehicle wheel 12, wherein the wheel disc 26 of the vehicle wheel 12 comprises a screw hole 160 for receiving a corresponding fastening screw 170, as is shown schematically in FIG. 26.

Figure 27:
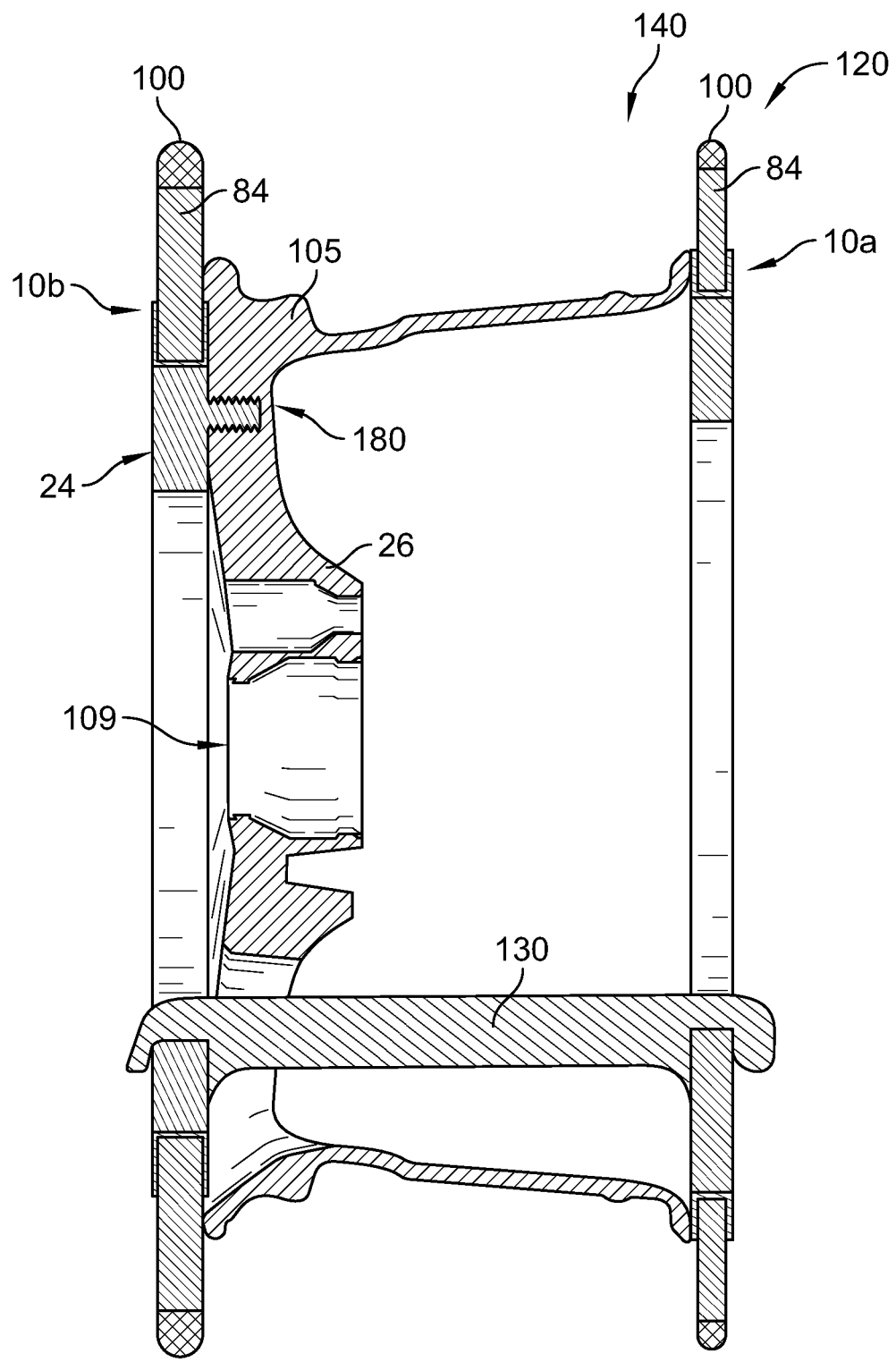
FIG. 27 shows an alternative embodiment of the attachment set in a schematic representation and in the state mounted on the vehicle wheel.

Alternatively, the attachment 10, or at least one of the attachments 10, can be capable of being connected to the wheel disc 26 of the vehicle wheel 12 via a bolt-and-hole connection 180, which is preferably of self-tensioning and/or self-locking form, as is shown schematically in FIG. 27.

The invention claimed is:

1. An attachment for a vehicle wheel for enabling driving operation with limited tire function, the attachment comprising:
   a base body, and
   a fastening device for fastening the attachment to a rim of the vehicle wheel,
   wherein the base body, when seen in an axial direction, is circular or annular in shape,
   and wherein the fastening device comprises a plurality of detachable fastening members,
   and wherein the fastening device is configured such that at least one of the plurality of detachable fastening members, in at least two positions which are arranged offset relative to one another in the radial direction, can be connected to the base body, wherein the at least two positions are each adapted to a specific rim diameter.

2. An attachment for a vehicle wheel for enabling driving operation with limited tire function, the attachment comprising:
   a base body, and
   a fastening device for fastening the attachment to a rim of the vehicle wheel,
   wherein the base body, when seen in an axial direction, is circular or annular in shape,
   and wherein the fastening device is configured to be adaptable in respect of the rim diameter.

3. The attachment as claimed in claim 1, wherein the plurality of detachable fastening members comprises at least one of a spring mounted fastening member or a spring mounted holding lug to fasten the fastening device to the attachment.

4. An attachment for a vehicle wheel for enabling driving operation with limited tire function, the attachment comprising:
   a base body, and
   a fastening device for fastening the attachment to a rim of the vehicle wheel,
   wherein the base body, when seen in an axial direction, is circular or annular in shape,
   and wherein the fastening device comprises a hook portion configured to engage behind a rim flange of the rim of the vehicle wheel.

5. The attachment as claimed in claim 4, wherein the fastening device comprises a contact portion arranged on the hook portion, wherein the contact portion comprises a resilient, elastic coating for preventing damage to the rim flange.

6. The attachment as claimed in claim 5, wherein the contact portion is curved in a circumferential direction in order to rest on the rim flange.

7. The attachment as claimed in claim 1, wherein the fastening device is configured to contact the rim over at least a sixth of a circumferential extent of the rim upon mounting of the attachment on the vehicle wheel.

8. The attachment as claimed in claim 1, wherein the fastening device is configured such that the attachment, on fastening to the rim of the vehicle wheel, is urged in an axial direction towards the rim.

9. The attachment as claimed in claim 8, wherein the fastening device comprises a clamping surface sloped radially inwards in a linear or arcuate manner,
   and wherein the fastening device is configured such that the clamping surface, on fastening of the attachment to the rim of the vehicle wheel, moves radially inwards.

10. The attachment as claimed in claim 1, wherein the base body comprises a rim-side part and a part remote from the rim which is detachable from the rim-side part.

11. The attachment as claimed in claim 1, wherein the base body comprises at least two circumferential segments connected together in a circumferential direction by a detachable folding mechanism or an engagement structure.

12. The attachment as claimed in claim 1, wherein the attachment comprises a tread body formed of an elastically resilient material or has an elastically resilient structure.

\* \* \* \* \*